US012628739B2

(12) United States Patent
Vandike et al.

(10) Patent No.: US 12,628,739 B2
(45) Date of Patent: May 19, 2026

(54) SYSTEMS AND METHODS FOR DETERMINING AND CONTROLLING AN AGRICULTURAL MACHINE OPERATIONAL MODE

(71) Applicant: DEERE & COMPANY, Moline, IL (US)

(72) Inventors: Nathan R. Vandike, Geneseo, IL (US); Manoj T. Muttepawar, Pune (IN); Nikhil N. Anandwade, Kolhapur (IN); Bradley K. Yanke, Eldridge, IA (US)

(73) Assignee: Deere & Company, Moline, IL (US)

( * ) Notice: Subject to any disclaimer, the term of this patent is extended or adjusted under 35 U.S.C. 154(b) by 201 days.

(21) Appl. No.: 18/614,230

(22) Filed: Mar. 22, 2024

(65) Prior Publication Data

US 2025/0295065 A1 Sep. 25, 2025

(51) Int. Cl.
*A01D 41/127* (2006.01)

(52) U.S. Cl.
CPC ................................. *A01D 41/1278* (2013.01)

(58) Field of Classification Search
CPC ................................................. A01D 41/1278
See application file for complete search history.

(56) References Cited

U.S. PATENT DOCUMENTS

| | | | |
|---|---|---|---|
| 11,406,062 B2 | 8/2022 | Schrag et al. | |
| 2019/0141891 A1 | 5/2019 | Woytera et al. | |
| 2022/0377978 A1 | 12/2022 | Laugen et al. | |
| 2024/0049617 A1* | 2/2024 | Braun ..................... | H04L 12/40 |

FOREIGN PATENT DOCUMENTS

| | | | | |
|---|---|---|---|---|
| BR | 102022004881 A2 | | 12/2022 | |
| CN | 206194089 | * | 5/2017 | |
| CN | 20677607 | * | 12/2017 | |
| EP | 1523872 A1 | | 4/2005 | |
| JP | 2001231326 | * | 8/2001 | ............. A01D 34/24 |

OTHER PUBLICATIONS

JP 2001231326 Translation (Year: 2001).*
CN 206194089 Translation (Year: 2017).*
CN 20677607 Translation (Year: 2017).*

* cited by examiner

*Primary Examiner* — Russell Frejd
(74) *Attorney, Agent, or Firm* — Taft Stettinius & Hollister LLP; Stephen F. Rost

(57) ABSTRACT

Systems and methods are provided for controlling a state of an auxiliary device(s) of an agricultural machine. A monitoring system can be utilized to determine an operational mode of the agricultural machine, and a configuration monitoring system can be utilized to determine a current state of the auxiliary device(s). The current state of the auxiliary device(s) can be evaluated with respect to a predetermined state of the auxiliary device associated with the operational mode to determine whether the state of the auxiliary device(s) is to be adjusted. In certain instances, one or more feedback signals can indicate that the change in the state of the auxiliary device, and associated change in the profile of the agricultural machine, is to be delayed in response to detection of an obstacle. If the delay satisfies a predetermined threshold number, an operator alert signal can be generated for transmission via an output device.

20 Claims, 11 Drawing Sheets

800

802 — Assign task to agricultural machine

804 — Communicate task assignment to agricultural machine

806 — Identify corresponding operational mode

808 — Operate agricultural machine in associated operational mode

810 — Perform assigned task

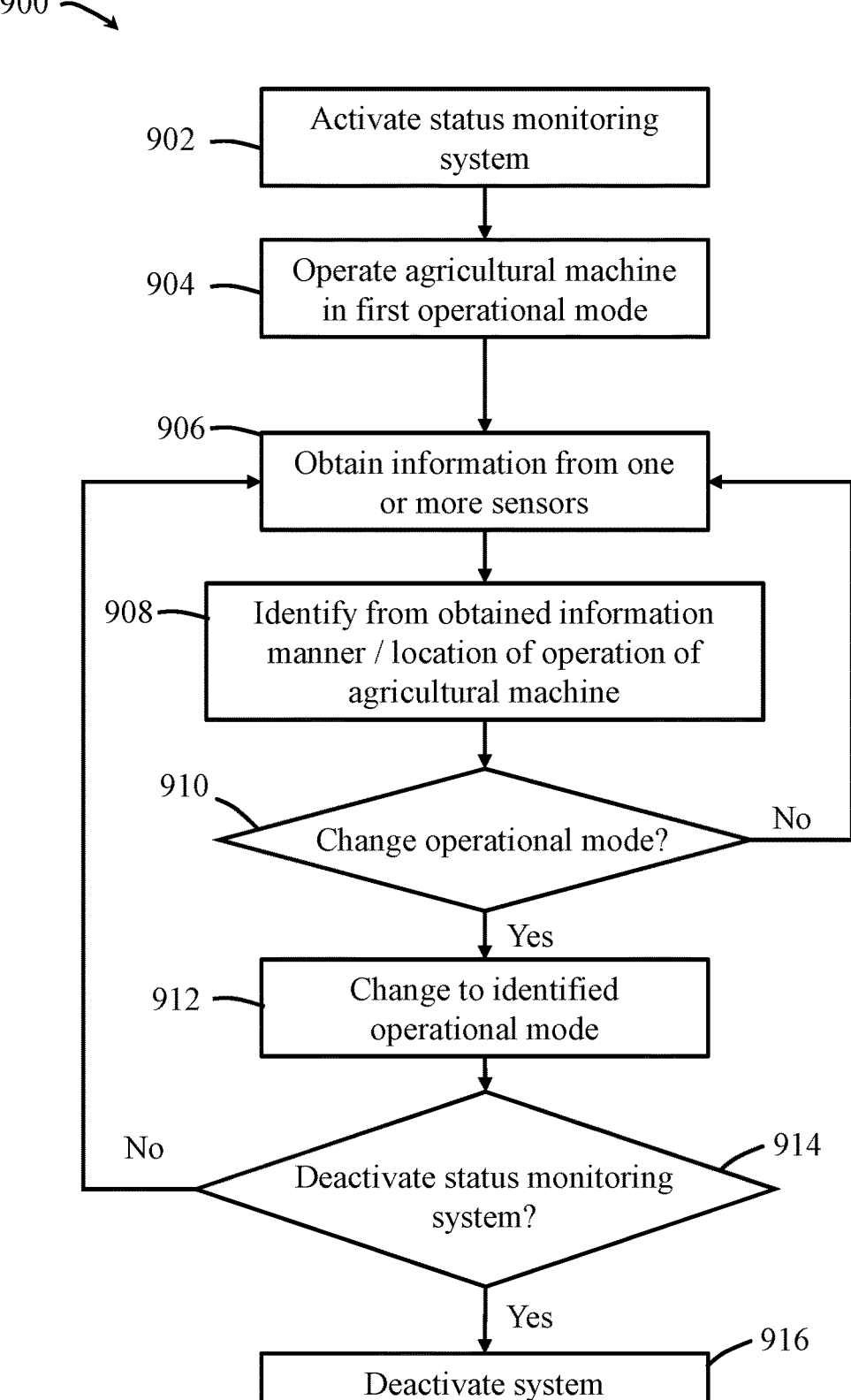

900

902 — Activate status monitoring system

904 — Operate agricultural machine in first operational mode

906 — Obtain information from one or more sensors

908 — Identify from obtained information manner / location of operation of agricultural machine 910 — Change operational mode?  No Yes 912 — Change to identified operational mode No  Deactivate status monitoring system?  914

Yes

916 — Deactivate system

FIGURE 9

SYSTEMS AND METHODS FOR DETERMINING AND CONTROLLING AN AGRICULTURAL MACHINE OPERATIONAL MODE

FIELD OF THE DISCLOSURE

The present disclosure generally relates to controlling the configuration of auxiliary components of an agricultural machine based, at least in part, on a determined operational mode for the agricultural machine.

BACKGROUND

Agricultural machines can include agricultural and construction vehicles and equipment, as well as combinations thereof, that are used to perform different agricultural and industrial tasks. For example, one or more agricultural machines, including, but not limited to harvesters and windrowers, can be utilized to plant crops, harvest crops, bale or otherwise collect crops, and spray or distribute crop inputs, such as, for example, fertilizer or chemicals, over a field or plants within a field.

SUMMARY

The present disclosure may include one or more of the following features and combinations thereof.

In one embodiment of the present disclosure, a method is provided for controlling a state of an auxiliary device of an agricultural machine comprising. The method can include determining an operational mode for the agricultural machine and identifying a predetermined state for the auxiliary device corresponding to the operational mode. Additionally, the method can further include sensing a current state of the auxiliary device and generating one or more signals to adjust, if the current state of the auxiliary device is different than the predetermined state, the auxiliary device to the predetermined state.

Additionally, according to another embodiment of the present disclosure, a method is provided for controlling a state of an auxiliary device of an agricultural machine. The method can include determining an operational mode for the agricultural machine and identifying a predetermined state for the auxiliary device corresponding to the operational mode. Additionally, the method can include determining a current state of the auxiliary device and receiving one or more first feedback signals containing information indicative of a presence of an obstacle to an adjustment of the auxiliary device from the current state to the predetermined state. Further, a determination can be made from information in the one or more first feedback signals, whether to delay or proceed with the adjustment of the auxiliary device. The method can also include determining, in response to determining to delay the adjustment of the auxiliary device, whether a predetermined threshold number of delays has been satisfied, and receiving, if the adjustment of the auxiliary device has been delayed and the predetermined threshold number of delays has not been satisfied, a second feedback signal indicative of an absence or a removal of the obstacle. Additionally, in response to at least receipt of the second feedback signal, the auxiliary device can be adjusted to the predetermined state.

Further, according to another embodiment of the present disclosure a system is provided for an agricultural machine, the system comprising an auxiliary device configured for selective displacement between at least a first state and a second state and an auxiliary sensor. The auxiliary sensor can be configured to provide information indicative of a current state of the auxiliary device, the current state corresponding to the auxiliary device being at the first state, the second state, or an intermediate state between the first state and the second state. The system can also include an actuator that can be configured to displace the auxiliary device at least between the first state and the second state, an onboard sensor, at least one processor, and a memory device coupled to the at least one processor. The memory device can include instructions that when executed by the at least one processor cause one or more of the at least one processor to determine an operational mode for the agricultural machine, identify a predetermined state for the auxiliary device corresponding to the operational mode, identify, from, information provided by the auxiliary sensor, the current state of the auxiliary device, and determine, if the current state is different than the predetermined state, an adjustment to an outer profile of at least a portion of the agricultural machine that will occur if the auxiliary device is displaced to the predetermined state. Additionally, the memory device can include instructions that when executed by the at least one processor cause one or more of the at least one processor to identify, using information provided by the onboard sensor, an external obstacle to the adjustment of outer profile if the auxiliary device were to be displaced to the predetermined state, and delay, in response to the external obstacle being identified, the displacement of the auxiliary device to the predetermined state. Further, the memory device can include instructions that when executed by the at least one processor can cause one or more of the at least one processor to determine, after the delay, an absence or a change in a position of the external obstacle, and adjust, in response to the absence or the change in position of the external obstacle, the outer profile of at least the portion of the agricultural machine by at least displacement of the auxiliary device to the predetermined state.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 9 illustrates an additional exemplary method for automatically determining an operational mode for an agricultural machine.

Corresponding reference numerals are used to indicate corresponding parts throughout the several views.

DETAILED DESCRIPTION

Figure 1:
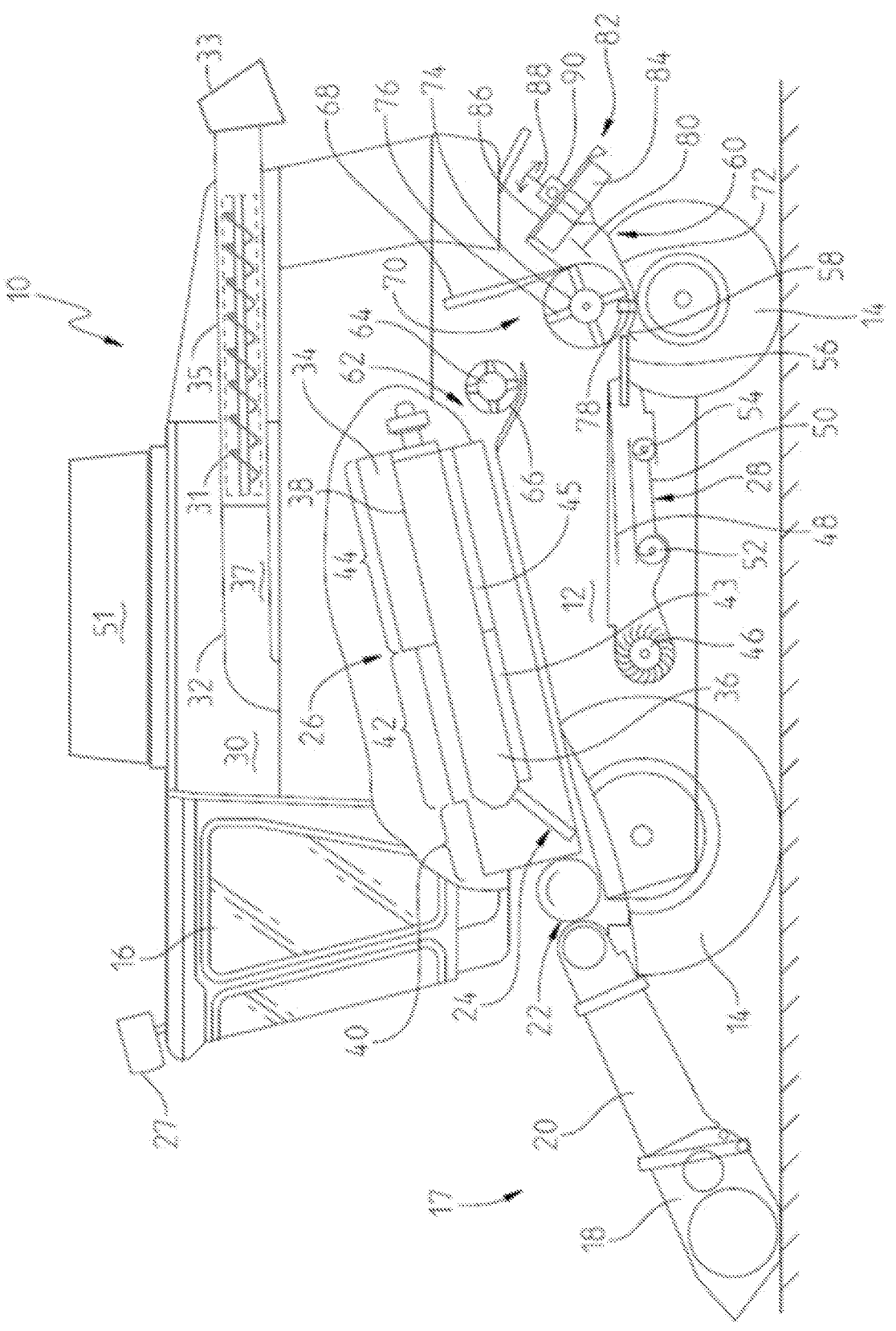
FIG. 1 illustrates an exemplary embodiment of an agricultural machine in the form of a harvester having a grain tank cover in an open position.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements or orderings. However, it should be appreciated that such specific arrangements or orderings may not be required. Rather, in some embodiments, such features may be arranged in a different manner or order than shown in the illustrative figures. Additionally, the inclusion of a structural or method feature in a particular figure is not meant to imply that such feature is required in all embodiments and, in some embodiments, may not be included or may be combined with other features.

Embodiments of the subject disclosure provide systems and methods for monitoring and controlling an operational status, or mode, of an agricultural machine. Moreover, embodiments of the subject disclosure relate to automatically monitoring and controlling a state, including, for example, a position or configuration, of one or more components, systems, or devices of an agricultural machine in connection with the agricultural machine transiting between different operational modes. According to certain embodiments, a status monitoring system can be utilized to automatically identify that the agricultural machine is to transition from one operational mode to another operational mode based at least one or more of a position of the agricultural machine, a task assigned to the agricultural machine, or information provided by one or more dynamic sensors, as well as various combinations, among other information. Further, according to certain embodiments, the operational modes can correspond, for example, to the agricultural machine being in a transport mode and a field or mode, among other modes. Additionally, according to certain embodiments, in connection with a determination an operational mode for the agricultural machine, as well as to when to transition to a different operational mode, the status monitoring system can further be utilized to adjust a state of one or more auxiliary devices. For example, using information regarding a predetermined state an auxiliary device is to have for an identified operational mode, and information regarding the actual, or current, state of the auxiliary device, the status monitoring system, including an associated controller, can determine whether to adjust the current state of the auxiliary device. Additionally, or alternatively, an interlock monitoring system can further be utilized in connection with determining whether current conditions or circumstances should, at least temporarily, delay or prohibit an adjustment in the state of the auxiliary device, or at least delay a transition of the agricultural machine to another operational mode.

An agricultural machine that is traveling while not engaged in the performance of an agricultural operation can generally, in at least certain embodiments or situations, be viewed as operating in a transport mode. For example, an agricultural machine traveling along a road, including to or between fields, traveling across a field in which an agricultural operation associated with the type that the agricultural machine performs has been completed (e.g., a harvester traveling across an already harvested field), or traveling to or from garages, among other destinations, can be viewed as operating in the transport mode. Conversely, an agricultural machine that is engaged in an agricultural operation can generally be viewed as operating in a field mode, among other modes. Thus, for example, a harvester can be in the field mode as the harvester harvests crop, as well as performs turns in headland areas in connection with a harvesting operation.

In the transport mode, certain portions, including components, systems, or subsystems of the agricultural machine can be at a position(s) or orientation(s) that are different than the position(s) or orientation(s) those same components, systems, or subsystems will be at when the agricultural machine is in at least some other operational modes, including the field mode. Some of the changes to the agricultural machine can, with respect to the transport mode, relate to decreasing a size of an exterior profile of at least a portion of the agricultural machine, including for example, either or both an exterior width and height of the agricultural machine or a space, or portions of a space, occupied by the agricultural machine. Such a reduction in the profile of the agricultural machine can, for example, accommodate the agricultural machine traveling in areas in which the space available may be reduced, including relative to a generally open field. For example, such a reduction in size of the profile of the agricultural machine for the transport mode can accommodate passage of the agricultural machine on a road or between buildings, among other obstructions.

The differences in the configuration of the agricultural machine for different operational mode are, however, not limited to the profile size of the agricultural machine. For example, different components, systems, or subsystems of the agricultural machine can have different settings for different operational modes. For instance, certain operational modes can have different settings for a suspension system of the agricultural machine. Further, in a non-limiting example, at least some agricultural machines can utilize a framed body having a center frame and one or more wings on opposing sides of the center frame. During an agricultural operation when the agricultural machine is in the field mode, the one or more wings can be in lowered, or unfolded positions so as to be closer or adjacent to the crops upon which equipment supported by the wing sections are performing an agricultural operation. Further, in the field mode, the lowered wings can be supported by at least wheels located below the lowered wings that contact the ground surface. In such embodiments, when in the field state, the suspension system can be at a first setting or configuration that can accommodate a degree of flexibility of pivotal displacement of the wing sections relative to at least the center frame. However, in the transport mode, the wing sections can be in raised or folded positions wherein at least some of the wheels that had supported the wings while in the field mode are no longer in contact with the ground surface. Accordingly, in the transport mode, the suspension system can be at a second setting or configuration that is stiffer than the first setting so as to accommodate road travel, among other travel, of the agricultural machine. Accordingly, the particular positions or settings of one or more components, systems, or subsystems of the agricultural machine can vary for different modes of operation, and can be different for different agricultural machines, including different types of agricultural machines.

In FIG. 1, an embodiment of an agricultural machine 10 is shown. The agricultural machine 10 includes a frame 12 and one or more ground engaging mechanisms, such as wheels 14 or tracks, which are in contact with an underlying ground surface. In the illustrative embodiment, the wheels 14 are coupled to the frame 12 and are used for propulsion of the agricultural machine 10 in a forward operating direction (which is to the left in FIG. 1) and in other directions. In some embodiments, operation of the agricultural machine 10 is controlled from an operator cab 16. The operator cab 16 can include any number of controls for controlling the operation of the agricultural machine 10, such as a user interface. In some embodiments, operation of the agricultural machine 10 can be conducted by a human operator in the operator cab 16, a remote human operator, or an automated system. Thus, according to certain embodiments, the agricultural machine 10 can be an autonomous or semi-autonomous vehicle. Moreover, according to certain embodiments, the agricultural machine 10 can be, or be operated, as an unmanned vehicle. Thus, according to certain embodiments, the agricultural machine 10 may not include an operator cab 16.

The agricultural machine 10 can also include an agricultural system. For example, as mentioned above, the illustrated agricultural machine 10 is a harvester. Thus, the agricultural system can include a plurality of components, or subsystems, relating to the agricultural machine 10 performing an agricultural operation at least in the form of harvesting crops. Thus, the agricultural systems for different types of agricultural machines 10 can be configured, including having components or subsystems, for the particular agricultural operation(s) that is to be performed by that agricultural machine 10. For example, the agricultural system of an agricultural machine 10 in the form of a windrower can be configured to perform agricultural operations at least relating to the formation of windrows.

With respect to the exemplary agricultural machine 10 depicted in FIG. 1, the agricultural machine 10 can include a header system 17 having a cutting head 18 is disposed at a forward end of the agricultural machine 10 and is used to harvest crop (such as corn) and to conduct the harvested crop to a slope conveyor 20 of the header system 17. The slope conveyor 20 conducts the harvested crop to a guide drum 22. The guide drum 22 of the agricultural machine 10 guides the harvested crop to an inlet 24 of a threshing assembly 26, as shown in FIG. 1. The threshing assembly 26 of the agricultural machine 10 includes a housing 34 and one or more threshing rotors. A single threshing rotor 36 is shown in FIG. 1, and the threshing rotor 36 includes a drum 38. The threshing assembly 26 includes a charging section 40, a threshing section 42, and a separating section 44. The charging section 40 is arranged at a front end of the threshing assembly 26, the separating section 44 is arranged at a rear end of the threshing assembly 26, and the threshing section 42 is arranged between the charging section 40 and the separating section 44.

Harvest crop that includes grain, such as corn, and material other than grain (MOG) falls through a thresher basket 43 positioned in the threshing section 42 and through a separating grate 45 positioned in the separating section 44. The harvested crop can be directed to a clean crop routing assembly 28 with a blower 46 and sieves 48, 50 with louvers. The sieves 48, 50 can be oscillated in a fore-and-aft direction. The clean crop routing assembly 28 of the agricultural machine 10 removes the MOG and guides grain over an unloading conveyor 52 to an elevator for grain. The elevator for grain deposits the grain in a grain tank 30 of the agricultural machine 10, as shown in FIG. 1. The grain in the grain tank 30 can be unloaded by means of an unloading conveyor 32 to a grain wagon, trailer, or truck, for example. An auger 31, among other conveyance means, including a conveyor, within the unloading conveyor 32 can be selectively operated, such as, for example rotated, to convey the grain along the unloading conveyor 32, wherein the grain can exit the unloading conveyor 32 through a spout 33.

According to certain embodiments, a spout control system having an actuator, including, for example, a servomotor, electric motor, or an electro-hydraulic mechanism, can be utilized to adjust the state of the spout 33, including the position, orientation, or configuration of the spout 33. The spout 33 can have one or more states, such as, for example, first and second states, which can each be associated with one or more operational modes, respectively, of the agricultural machine 10, including, for example, a transport mode and a field mode. Further, one or more sensors can be utilized to detect, or provide information to derive, the state of the of the spout 33. Such different states of the spout 33 correspond to differences in the size, shape, and location of the outer profile of at least a corresponding portion of the agricultural machine 10.

According to certain embodiments, at least a first section 35 of the unloading conveyor 32 can be angularly displaced via selective operation of an actuator relative to another, second section 37 of the unloading conveyor 32. Further, each of the first and second sections 35, 37 of the unloading conveyor 32 can include different portions of the auger 31. Such relative displacement of the first and second sections 35, 37 of the unloading conveyor 32 can be utilized to selectively displace the unloading conveyor 32 between a folded state and an unfolded state. The folded state can be associated, for example, with operation of the agricultural machine 10 in at least the first operational mode, such as, for example, the transport mode, and the unfolded state can be associated with another, or second operational mode, such as, for example, the field mode. Whether the unloading conveyor 32 is in the first or second state, among other states, can be determined by, or using, information provided by one or more sensors. Further, the profile of at least a portion of the agricultural machine 10 can be different for each of the folded and unfolded states of the conveyor 32.

Harvested crop remaining at an end of the sieve 50 can, according to certain embodiments or operations, be again transported to the threshing assembly 26 by a conveyor 54 where it is reprocessed by the threshing assembly 26. Alternatively, according to other embodiments, crop remaining at the end of the sieve 50 can be transported to a rethreshing device. Harvested crop delivered at an end of the sieve 48 is conveyed by an oscillating sheet conveyor 56 to a lower inlet 58 of a crop debris routing assembly 60. Harvested crop at the threshing assembly 26 is processed by the separating section 44 resulting in straw being separated from other material of the harvested crop. The straw is ejected through an outlet 62 of the threshing assembly 26 and conducted to an ejection drum 64. The ejection drum 64 interacts with a sheet 66 arranged underneath the ejection drum 64 to move the straw rearwardly. A wall 68 is located to the rear of the ejection drum 64 and guides the straw into an upper inlet 70 of the crop debris routing assembly 60.

The crop debris routing assembly 60 of the agricultural machine 10 includes a chopper assembly having a chopper housing 72 and a chopper rotor 74 arranged in the chopper housing 72 that rotates, for example, in a counterclockwise direction about an axis that extends, for example, perpendicular to the forward operating direction. The chopper rotor 74 includes a plurality of chopper knives 76 that are distributed around a circumference of the chopper rotor 74. The chopper knives 76 interact with opposing knives 78, which are, for example, coupled to the chopper housing 72. The chopper knives 76 and the opposing knives 78 cooperate to chop the straw into smaller pieces.

Additionally, the grain tank 30 can include one or more grain tank covers 51 that can be displaced between a first, closed state and a second, open state. In at least certain situations while the agricultural machine 10 is operating, for example, in the field mode, the grain tank cover(s) 51 can be retained in an open state, as shown in FIG. 1. Such an open state can accommodate an unobstructed top view of the harvested and stored grain in the grain tank 30. Additionally, or alternatively, retaining the grain tank cover 51 in an open position while operating the agricultural machine 10 in the field mode can potentially increase the capacity of the grain tank 30 by virtue of allowing a central portion of the pile of grain to extend somewhat above the top of the underlying grain tank 30. However, when operating in at least the transport mode, the grain cover(s) 51 can be retained in the closed position. One or more actuators, including, for example, motors or cylinders, as well as combinations thereof, among other actuators, can be utilized to control displacement of the grain cover 51 between the open and closed states. Whether the grain tank cover 51 is, or is not, currently in the open or closed state, as well as positions therebetween, can be determined, including identified, via information provided by one or more sensors.

According to certain embodiments, information provided by one or more sensors of the agricultural machine 10 can indicate whether an obstruction is positioned relative to at least the grain tank covers 51 that may preclude, or otherwise interfere or present a potential hazard with respect to the grain tank cover(s) 51 being displaced to either the open or closed position. For example, as mentioned above, while operating in the field mode, having the grain tank cover 51 in an at least partially open position can accommodate a central portion of the pile of grain within the grain tank 30 extending above the top of the grain tank 30. However, such a grain pile configuration can provide an internal obstruction relative to the agricultural machine 10 that can interfere with the closing of the grain tank cover(s) 51. Thus, one or more sensors can indicate that, based on the current height or configuration of the grain pile, among other internal obstructions, the grain tank cover(s) 51 should not attempt to close. Conversely, one or more sensors, including, for example, an optical sensor, can indicate the presence of an obstruction external to the agricultural machine 10, such as, for example, a power line, tree, or structure, among other external obstructions, is positioned at a location that could interfere with, or prohibit, the opening of the grain tank cover(s) 51.

Figure 2B:
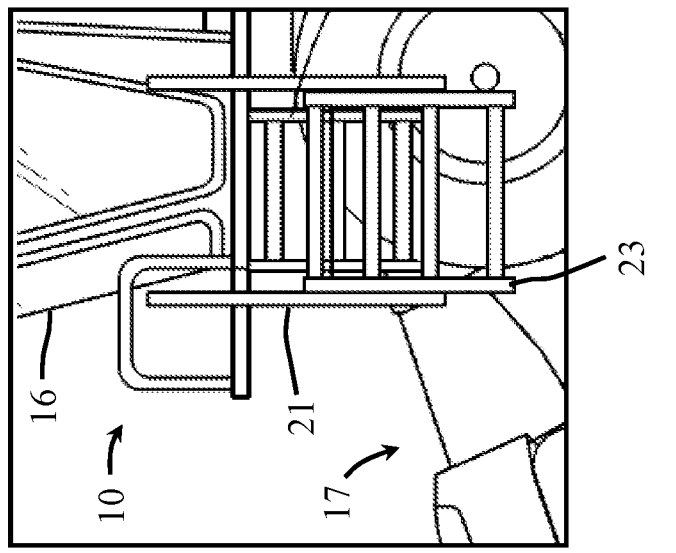
FIGS. 2A and 2B illustrate an exemplary agricultural machine having a ladder in a first, lowered position and a second, raised position, respectively.
Figure 2A:
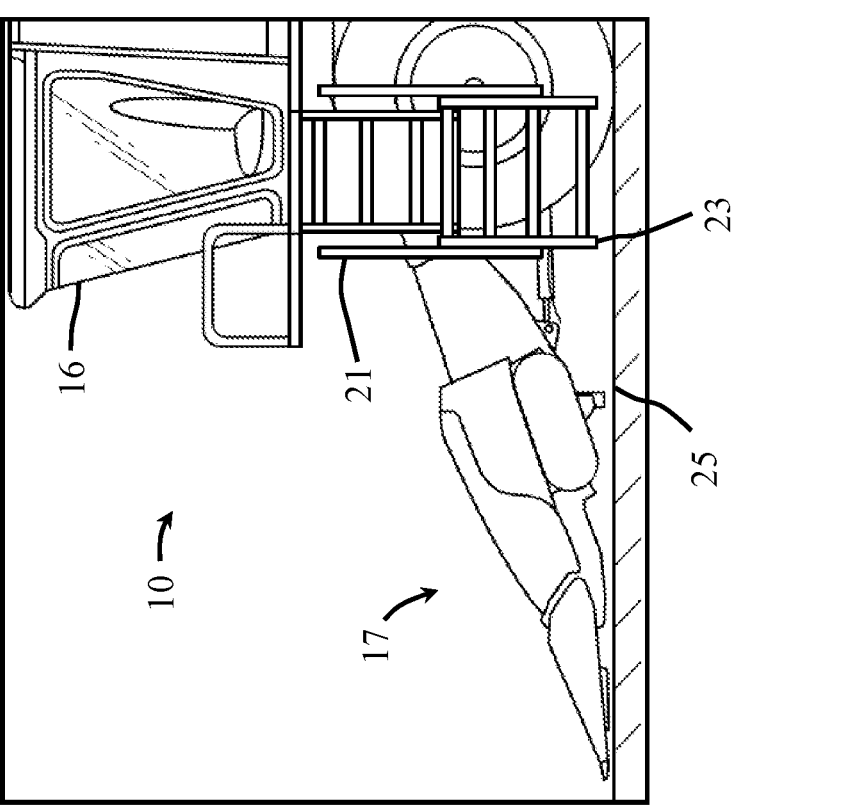

Referencing FIGS. 2A and 2B, at least certain types of agricultural machines 10 can include a ladder 21. The ladder 21 can be configured to be displaced between a first, lowered position, as seen in FIG. 2A, and a second, raised position, as seen in FIG. 2B. Such displacement, which, for example, can be a linear or rotational displacement, or combination thereof, can at least adjust a vertical position of the ladder 21. Moreover, such displacement can at least adjust a vertical location of a bottom end 23 of the ladder 21 relative to the adjacent ground surface 25, as well as an angular orientation of the ladder 21 that can impact a size of the profile of at least a portion of the agricultural machine 10, including the width of the agricultural machine 10. Additionally, such displacement can be associated with different operational modes. For example, with respect to at least certain agricultural machines 10, the ladder 21 can be in the raised position, and, optionally, rotationally pivoted, when certain agricultural machine 10 is in a first operational mode, such as, for example the transport mode. Further, with respect to certain agricultural machines 10, at least during a portion of time that the agricultural machine 10 is in another, or second, operational mode, the ladder 21 can be, at least temporarily, in the lowered position, including, for example, prior to the agricultural machine 10 being operated to perform a task or job. Whether the ladder 21 is currently in the lowered position, the raised position, or a pivoted or rotated position in combination with one of the lowered position or the raised position can be detected by one or more sensors. Additionally, according to certain embodiments, displacement of the ladder between the lowered or raised positions, as well as positions therebetween, can be facilitated by operation of an actuator, which can, for example, be automatically operated in response to a change in the operational mode of the agricultural machine 10. Additionally, the overall width or profile of at least a portion of the agricultural machine 10 when the ladder 21 is in the first position can be different than when the ladder 21 is in the second position.

Figure 3B:
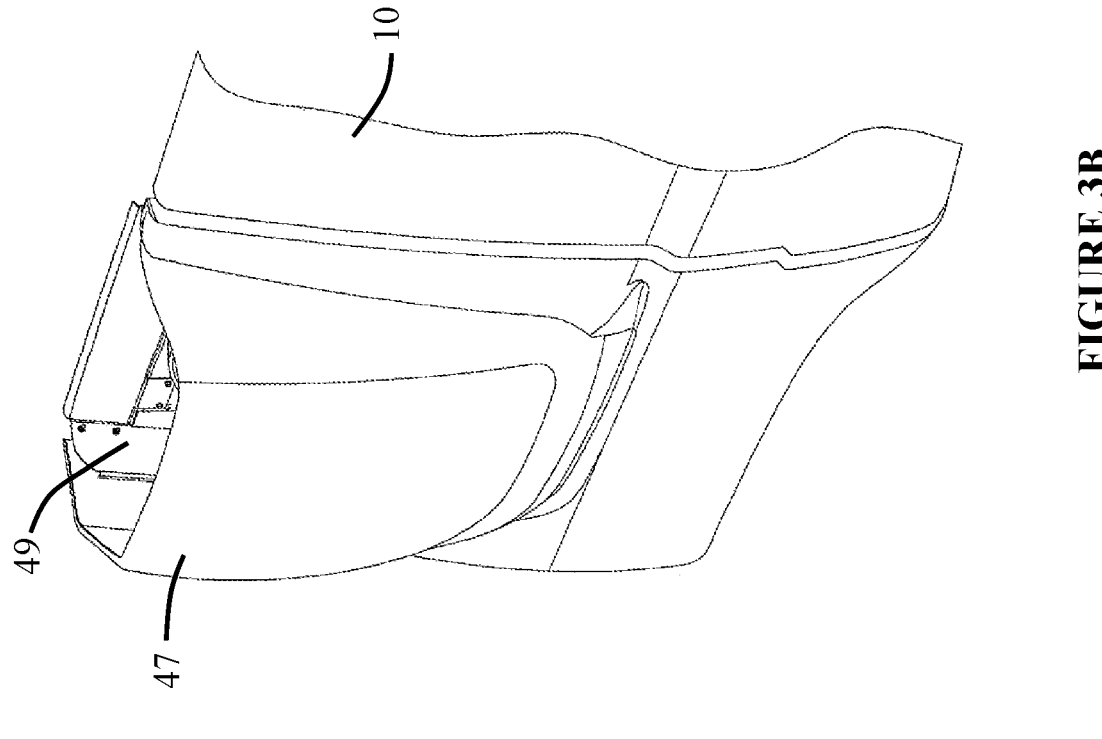
FIGS. 3A and 3B illustrate an exemplary air scoop for an agricultural machine in a first, closed position and a second, open position, respectively.
Figure 3A:
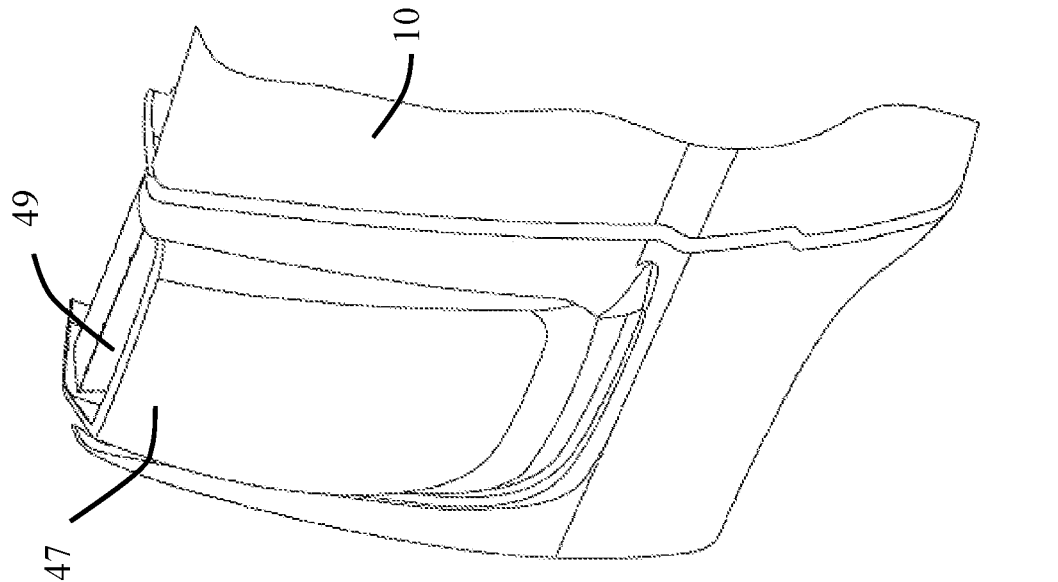

Referencing FIGS. 3A and 3B, the agricultural machine 10 can further include an air scoop 47 positioned about an exterior portion of the agricultural machine 10. The air scoop 47 can be foldable between a first, closed position, as seen in FIG. 3A, and a second, open position, as seen in FIG. 3B. According to certain embodiments, the air scoop 47 can be associated with drawing air through an inlet 49 of the air scoop 47, with the drawn air being directed to flow into at least a portion of the agricultural machine 10, including, for example, to an engine or cooling system of the agricultural machine 10. For example, according to certain embodiments, when in the second, open position the air scoop 47 can assist with drawing ambient air into the agricultural machine 10 that may be directed to flow to a radiator or other heat exchanger of the agricultural machine 10. However, when in the second, open position, the air scoop 47 can increase a size of the profile of at least a portion of the agricultural machine 10, such as, for example, the width or height of at least a portion of the exterior of the agricultural machine 10. Thus, according to certain embodiments, the air scoop 47 can be in the first, closed position while in the agricultural machine 10 is, for example, in the transport mode so as to minimize the likelihood that the air scoop 47 could potentially contact a passing or nearby obstruction. Conversely, when operating in the field mode, and, moreover, in a more generally open area such as a field, the air scoop 47 can be in the second, open position. Whether the air scoop 47 is in either the open position or the closed position can therefore be associated with the current operational mode of the agricultural machine 10. Further, displacement of the air scoop 47 between the open and closed positions can be facilitated by operation of one or more actuators. The agricultural machine 10 can also include one or more sensors, including for example, positional sensors, which can provide an indication of whether the air scoop 47 is currently in the open position or the closed position.

Figure 4:
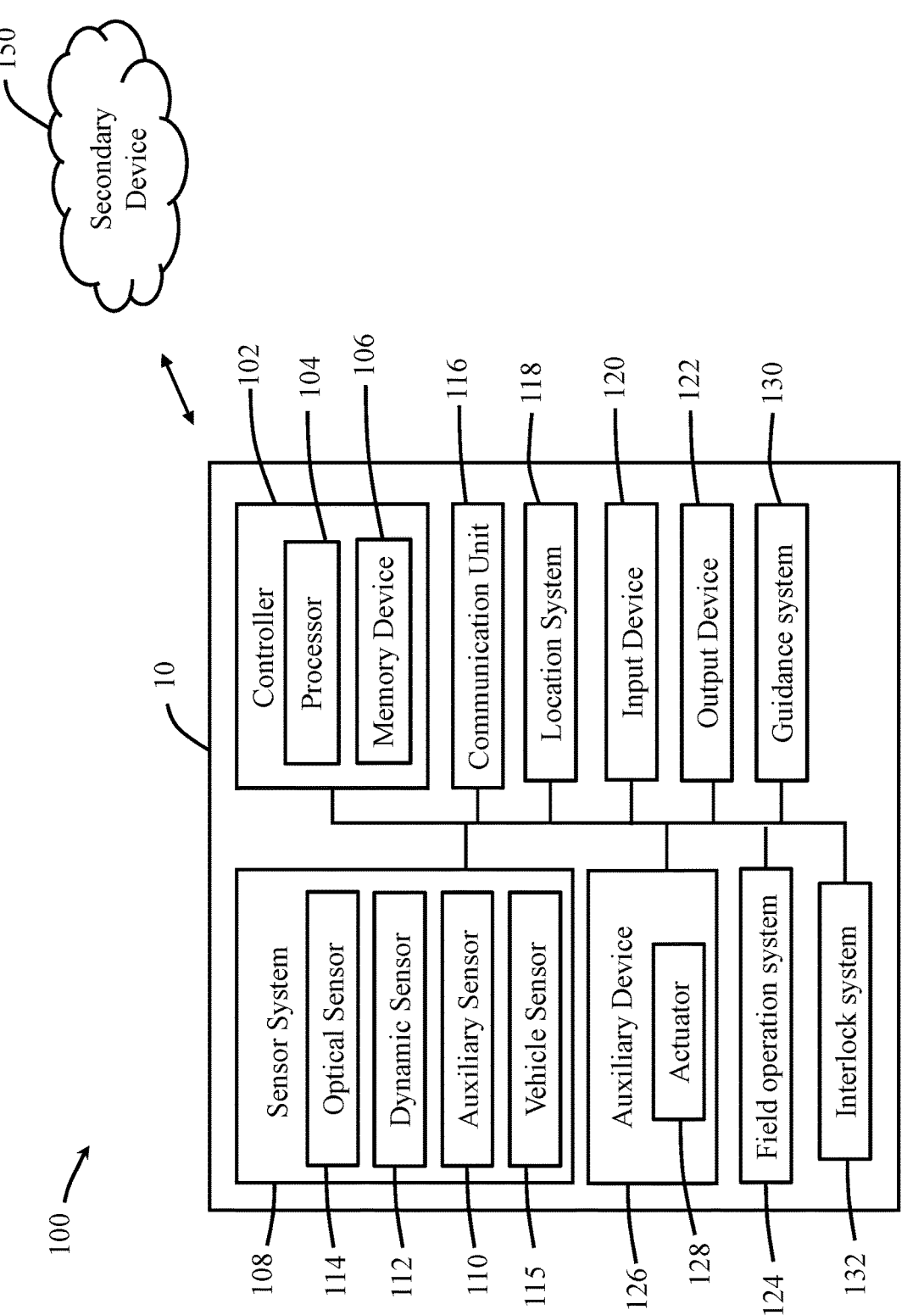
FIG. 4 illustrates a simplified block diagram of a status monitoring system for automatically transitioning an agricultural machine between a plurality of operational modes.

FIG. 4 illustrates a simplified block diagram of a status monitoring system 100 for automatically identifying either or both a current operational mode of the agricultural machine 10 or an adjustment in the operational mode for the agricultural machine 10. The status monitoring system 100 can also be configured to assist the transition from the current operational mode to an operational mode identified by the status monitoring system 100, including a timing at which such a transition is to occur.

The status monitoring system 100 can include one or more controllers 102 having at least one processor 104 and at least one memory device 106. The controller 102, processor(s) 104, or memory device(s) 106, as well as any combination thereof, may, or may not, be dedicated to the operation of the status monitoring system 100, or components of the status monitoring system 100. Thus, for example, according to certain embodiments, the processor 104 can include one or more processors, including compute circuits, that can be utilized to control operation of the status monitoring system 100, and, optionally, can also be utilized in connection with controlling one or more other operations or components of the agricultural machine 10, including systems or subsystems thereof. Therefore, according to certain embodiments, one controller 102, including one or more processors 104 of that controller 102, can be utilized to control operation of at least the status monitoring system 100, or the corresponding components, portions, or segments of the status monitoring system 100. Alternatively, a plurality of controllers 102, or combinations of processors 104, including compute circuits, can be utilized to control operation of the status monitoring system 100, as well as control operations of different components or systems of the agricultural machine 10. Thus, for example, while certain embodiments herein may mention functions being performed by a controller 102, including the associated processor 104, such functions can be performed by a single controller or processor, or, alternatively, one or more functions can be performed by one or more controllers or processors, and one or more other functions can be performed by one or more other controllers or processors or combinations of controllers or processors.

The memory device 106 can have instructions stored therein that are executable by the processor 104 to cause the processor 104 to receive input from one or more sensors of either or both the status monitoring system 100 or other portions, components, systems, or subsystems of the agricultural machine 10. The processor 104 can be embodied as, or otherwise include any type of processor, controller, or other compute circuit capable of performing various tasks such as either or both compute functions and controlling the functions of at least the status monitoring system 100 or other aspects of the agricultural machine 10. For example, the processor 104 can be embodied as a single or multi-core processor(s), a microcontroller, or other processor, processing, or controlling circuit. In some embodiments, the processor 104 can be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 104 can be embodied as, or otherwise include a high-power processor, an accelerator co-processor, or a storage controller.

The memory device 106 can be embodied as any type of volatile (e.g., dynamic random-access memory (DRAM), etc.) or non-volatile memory capable of storing data therein. Volatile memory may be embodied as a storage medium that requires power to maintain the state of data stored by the medium. Non-limiting examples of volatile memory may include various types of random-access memory (RAM), such as dynamic random-access memory (DRAM) or static random-access memory (SRAM). One particular type of DRAM that may be used in a memory module is synchronous dynamic random-access memory (SDRAM).

In some embodiments, the memory device 106 can be embodied as a block addressable memory, such as those based on NAND or NOR technologies. The memory device 106 can also include future generation nonvolatile devices, such as a three-dimensional crosspoint memory device (e.g., Intel 3D XPoint™ memory), or other byte addressable write-in-place nonvolatile memory devices. In some embodiments, the memory device 106 can be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device 106 can refer to either or both the die itself and to a packaged memory product. In some embodiments, 3D crosspoint memory (e.g., Intel 3D XPoint™ memory) can include a transistor-less stackable cross point architecture in which memory cells sit at the intersection of word lines and bit lines and are individually addressable and in which bit storage is based on a change in bulk resistance.

The status monitoring system 100 can include a sensor system 108 having one or more sensors 110, 112, 114, 115 that can provide a variety of different information to at least the controller 102. The types, and locations, of the sensors 110, 112, 114, 115 can vary.

According to the illustrated embodiment, the sensor system 108 can include one or more auxiliary sensors 110 that can provide information regarding the state, including one or more of the position, orientation, or configuration of one or more auxiliary devices 126, which can also be referred to as extremity components, of the agricultural machine 10. According to certain embodiments, the auxiliary devices 126 can be components, including portions of systems or subsystems, of the agricultural machine 10, that can be displaced, such as, for example, linearly or angularly, as well as combinations thereof, among other forms of displacement, relative to other portions of an exterior of the agricultural machine 10 in a manner that can alter at least a portion of an outer profile of the agricultural machine 10. For example, one or more of the auxiliary devices 126 can be selectively displaced, such as, for example, in response to one or more signals generated by the controller 102 to operate an associated actuator 128, between different positions that can change an outer profile of at least a portion of the agricultural machine 10. For example, such auxiliary devices 126 can include one or more, if not all, of at least the foldable portions of the unloading conveyor 32, the at least linearly or rotatably displaceable ladder 21, the foldable air scoop 47, and the open and closeable grain tank covers 51, as discussed above. However, the auxiliary devices 126 can include a variety of other devices, systems, or subsystems that can undergo a change in configuration, position, or orientation, as well as combinations thereof, that can result in a change in a profile, including an overall width or configuration, of the at least a portion of an exterior of the agricultural machine 10. For instance, other examples of auxiliary devices 126 can further include, but are not limited to, folding heads and folding augers, among other components of the agricultural machine 10. As previously discussed, the current states, including position or orientation, of such exemplary auxiliary devices 126 can be determined by the controller 102 utilizing information provided by one or more associated sensors, also referred to herein as an auxiliary sensor(s) 108. Further, according to certain embodiments, each such auxiliary device 126 can, for each operational mode, have a predetermined state. Additionally, the predetermined state of an auxiliary device 126 for at least one operational mode can be different than the predetermined state of that same auxiliary device 126 for at least one other operational mode.

The sensor system 108 can further include one or more dynamic sensors 112. As discussed below, such dynamic sensors 112 can provide information to the controller 102 regarding a current status of the agricultural machine 10 that can be utilized by the controller 102 to determine a location, or location area type, at which the agricultural machine 10 is located or traveling. For example, such sensed information, including measured information, provided by the dynamic sensor 112 can indicate a level of vibration, acceleration, or motion, among other dynamic information, relating to a current state of movement of the agricultural machine 10. Therefore, according to certain embodiments, the dynamic sensor 112 can include at least one of an accelerometer, vibration sensor, or force sensor, as well as combinations thereof, among other types of dynamic sensors. As discussed below, information provided by the dynamic sensor(s) 112 to the controller 102 can be utilized by the controller 102 to determine, for example, whether the agricultural machine 10 is traveling along a field or a road, and thus be used in a determination by the controller 102 of whether the agricultural machine 10 is to be in the transport mode or the field mode, among other operational modes.

The sensor system 108 can further include one or more optical sensors 114 that can capture information regarding either or both the agricultural machine 10 and the area around the agricultural machine 10. A variety of different types of optical detection devices, including, for example, optical detection devices that can capture two-dimensional or three-dimensional information, can be utilized for the optical sensor 114, such as, but not limited to, stereo depth cameras, stereo sensors, RGBD (red, green, blue, depth) cameras, three-dimensional sensors, LIDAR, radar, and three-dimensional cameras, as well as combinations thereof, among other types of sensors. For example, the optical sensor 114, such as, for example, the camera 27 shown in FIG. 1, among other cameras or forms of optical sensors 114, can capture one or more images or video.

The controller 102 can be configured to utilize image recognition or other machine vision or identification to identify certain features or objects within the information captured by the optical sensor 114. For example, as discussed below, the controller 102 can be configured, or trained, to identify the agricultural machine 10, roads, and fields, among identifying or recognizing other objects represented in the captured information. For example, the controller 102 of the agricultural machine 10 can be configured to at least assist in the evaluation of such captured information from the optical sensor 114, such as, for example, on a pixel level, or based on a collection or area(s) of pixels, among other bases for evaluation. Such an evaluation can be based, for example, at least in part, on either or both a color or level of light present or not present in an area(s) or pixels in the captured information, as well as associated depth information. As discussed below, such evaluation can involve object identification, which can, for example, be performed on a pixel level. Moreover, according to certain embodiments, such evaluation of the captured information can include associating particular pixels from the image(s) or video(s) with a particular object that is anticipated to be present in the captured information, such as, for example, a portion of the agricultural machine, a crop material, or ground surface, or a road, among other objects.

As discussed below, according to certain embodiments, recognition or identification by the controller 102 of representations of the objects in the captured information obtained via operation of the optical sensor(s) 114 can be utilized by the controller 102 to determine if the agricultural machine 10 is on a road, in a field, entering a road or field, or exiting the field or road, among other locations. Moreover, such a determination by the controller 102 can be utilized to determine an agricultural mode for the agricultural machine 10, including, for example, what operational mode the agricultural machine 10 is to currently be operating, an upcoming operational mode to which the agricultural machine 10 is to operate, and if, or when, the agricultural machine 10 is to transition from one operating mode to another operating mode. The optical sensors 114 can also provide information regarding an identification of a job or crop status for a field in which an agricultural operation associated with the agricultural machine 10 is to be, or has been, performed, including, for example, whether a harvesting operation has not yet commenced or is to start, is in progress, or has been completed, among other status information.

The sensor system 108 can also include one or more vehicle sensors 115 that can provide information regarding the travel, movement, location, or motion of the agricultural machine 10 that is in addition to the type of information provided by the dynamic sensors 112. For example, the sensor system 108 can include one or more vehicle sensors 115 that can provide information regarding either, or both, a speed or heading at which the agricultural machine 10 is traveling. Additionally, or alternatively, the vehicle sensor 115 can be configured to provide information that can indicate, or be used to derive, a location of the associated agricultural machine 10. Additionally, according to certain embodiments, the heading of the agricultural machine 10 can be indicated by a vehicle sensor 115 in the form of a transmission sensor that can provide an indication of whether a transmission system of the agricultural machine 10 is engaged for the agricultural machine 10 to move in a forward, or reverse, heading. As discussed below, information provided by at least the vehicle sensor 115, alone or with other information such as, for example, location, guidance, or navigation information provided by a sensor(s), system(s), or subsystem(s) of the agricultural machine 10, can be utilized by the controller 102 to proactively determine, including estimate or predict, when the agricultural machine 10 will be entering onto a road or other area outside a field, or into a field, including a portion of a field in which the agricultural machine 10 is, or is not, to perform an agricultural operation. Such a determination by the controller 102 can be utilized to determine when the agricultural machine 10 should begin transitioning from one operational mode to another operational mode such that, upon entering into a particular area, the agricultural machine 10 has transitioned to the appropriate operational mode for that particular area.

The status monitoring system 100 can further include a communication unit 116 that can accommodate the communication of information, including, for example, a field boundary map, among other information, generated or stored by a secondary device 150, including, for example, a database or other agricultural machine, among other devices, equipment, and machinery. The communication unit 116 can be configured for either, or both, wired or wireless communications, including, for example, via proprietary and non-proprietary wireless communication protocols. For example, the communication unit 116 can be configured to accommodate Wi-Fi, ZigBee, Bluetooth, radio, cellular, or near-field communications, among other communications that use other communication protocols, including, but not limited to, communications over a wireless network 160, such as, for example internet, cellular, or Wi-Fi networks, as well as combinations thereof. According to certain embodiments, the communication unit 116 can include a transceiver.

The status monitoring system 100 can also include a navigation or location system 118, such as, for example, a global navigation satellite system, including, but not limited to, a global positioning system (GPS). The location system 118 can be operated to provide a detailed indication of the location of the agricultural machine 10, particularly as the agricultural machine 10 traverses across a field. According to certain embodiments, the location system 118 can include a receiver that can receive information from an external source that can indicate the location of the agricultural machine 10, including, for example, via location coordinates. Additionally, according to certain embodiments, the location system 27 can also include, for example, mapping software or navigation software that generates desired maps, navigation paths or routes and other geographic functions.

The agricultural machine 10 can further include a guidance system 130 that can guide a direction of travel of the agricultural machine 10 using the navigation paths generated by the location system 118.

The agricultural machine 10 can further include one or more input devices 120, such as, for example, one or more keyboards, keypads, touch screens, mouse, buttons, joysticks, switches, or mobile personal computing devices, such as, for example, mobile phones, smart phones, or tablets, as well as combinations thereof, among other types of input devices 120. Such input devices 120 can be configured to receive information, commands, or instructions inputted by an operator of the agricultural machine 10. Summarily, the agricultural machine 10 can include one or more output devices 122, including, for example, one or more displays or touchscreens, among other types of output devices. Further the input device 120 and the output device 122 can either, or both, be local to, and remote from, the agricultural machine 10.

The agricultural machine 10 can include one or more field operation systems 124 that are utilized in connection with the agricultural vehicle 10 performing an agricultural operation within a field. For example, with respect to embodiments in which the agricultural machine 10 is a harvester, the field operation system 124 can include at least portions, if not all, of the header system 17. Similarly, with respect to agricultural machines in the form of sprayers, the field operation systems 124 can include at least portions of a sprayer system that is configured to dispense, such as spray, crops in the field with a fluid that is disperse from one or more sprayers of the sprayer system. As another non-limiting example, with respect to agricultural machines utilized for tilling operations, the field operations system 124 can include at least a portion of a tillage system.

According to certain embodiments, the field operation system 124 can further include at least a portion of the agricultural machine 10 that is moved to a different position or orientation based for at least one operational mode of the agricultural machine 10. For example, at least a portion of the field operation system 124 can be positioned on, or supported by, one or more wings or sections of a frame of, or coupled to, the agricultural machine 10 that can be displaced, for example, folded and unfolded, relative to a central frame of the frame. In such an example, whether the wing(s) or extension(s) is, or is not, folded or unfolded can depend at least on the current operational mode of the agricultural machine 10. For example, with respect to embodiments in which the agricultural machine 10 is a harvester, the header system 17 can include a portion of the cutting head 18, as well as row dividers, among other components of the header system 17, that are positioned about a central frame and a pair of wings. Each wing can be on an opposite side of the central frame and displaced between a raised, or folded position and a lowered, or unfolded position. According to such an embodiment, while performing an agricultural operation, such as, for example, when the harvester is in the field mode, the wings can be in the lowered, unfolded position to engage crop material in the field. Thus, when in the unfolded position, a width across the header system 17 in a direction generally perpendicular to a longitudinal direction of travel of the harvester can have a first size. However, when the harvester is in the transport mode, the wings can be in the raised, or folded position relative to at least the center frame. With the wings raised, the width of the header system 17 in the same direction generally perpendicular to the longitudinal direction of travel of the harvester can have a second size that is smaller than the first size. Such a reduction in the width of the header system 17, and thus at least a portion of the outer profile of the agricultural machine 10, when in the transport mode can, compared to a generally open field, assist with the harvester traveling in potentially smaller, or narrower areas, including, for example, along roads.

Figure 5:
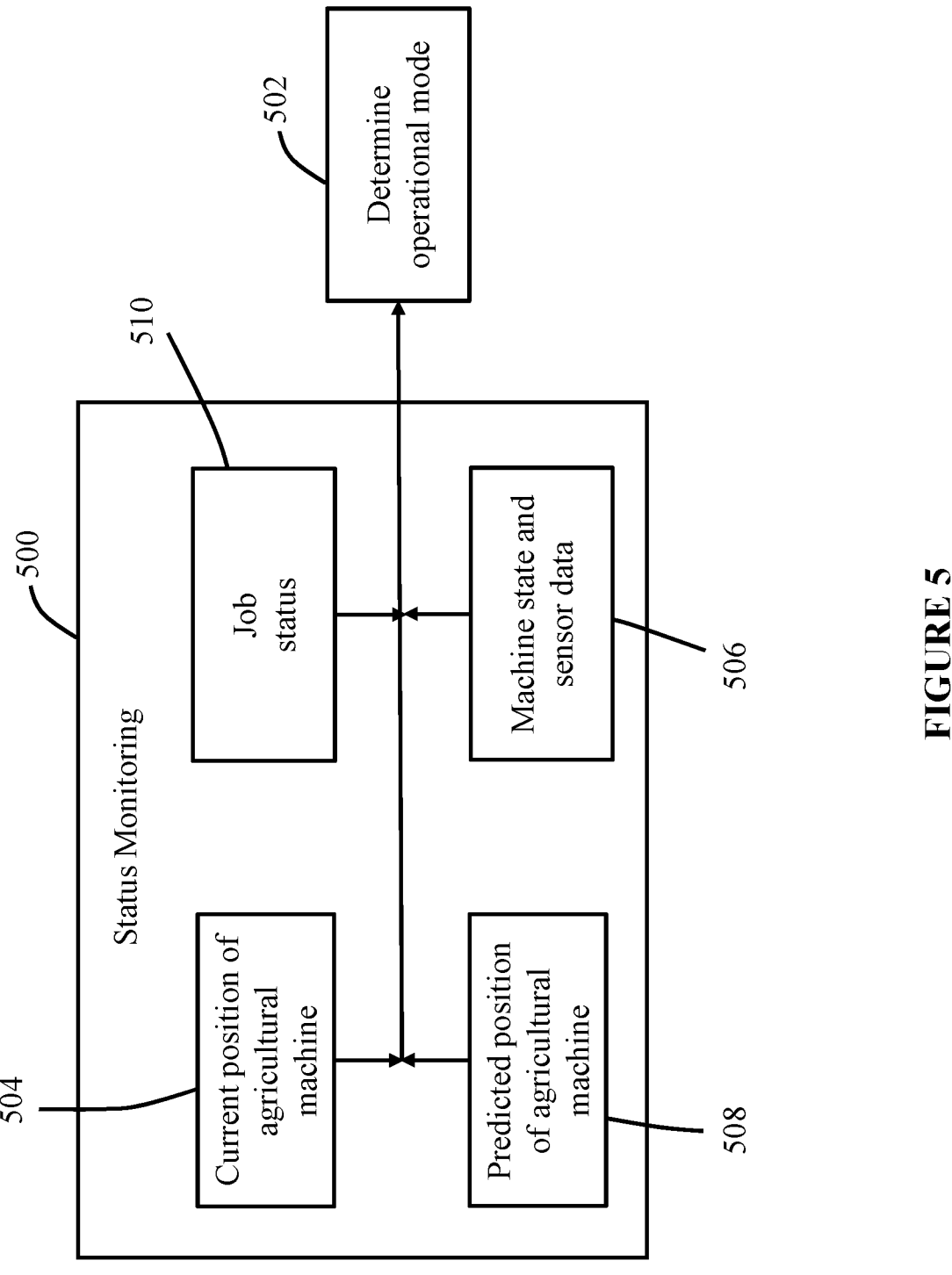
FIG. 5 illustrates an exemplary block diagram of a simplified representation of an approach to determining an operational mode for an agricultural machine.
Figure 6:
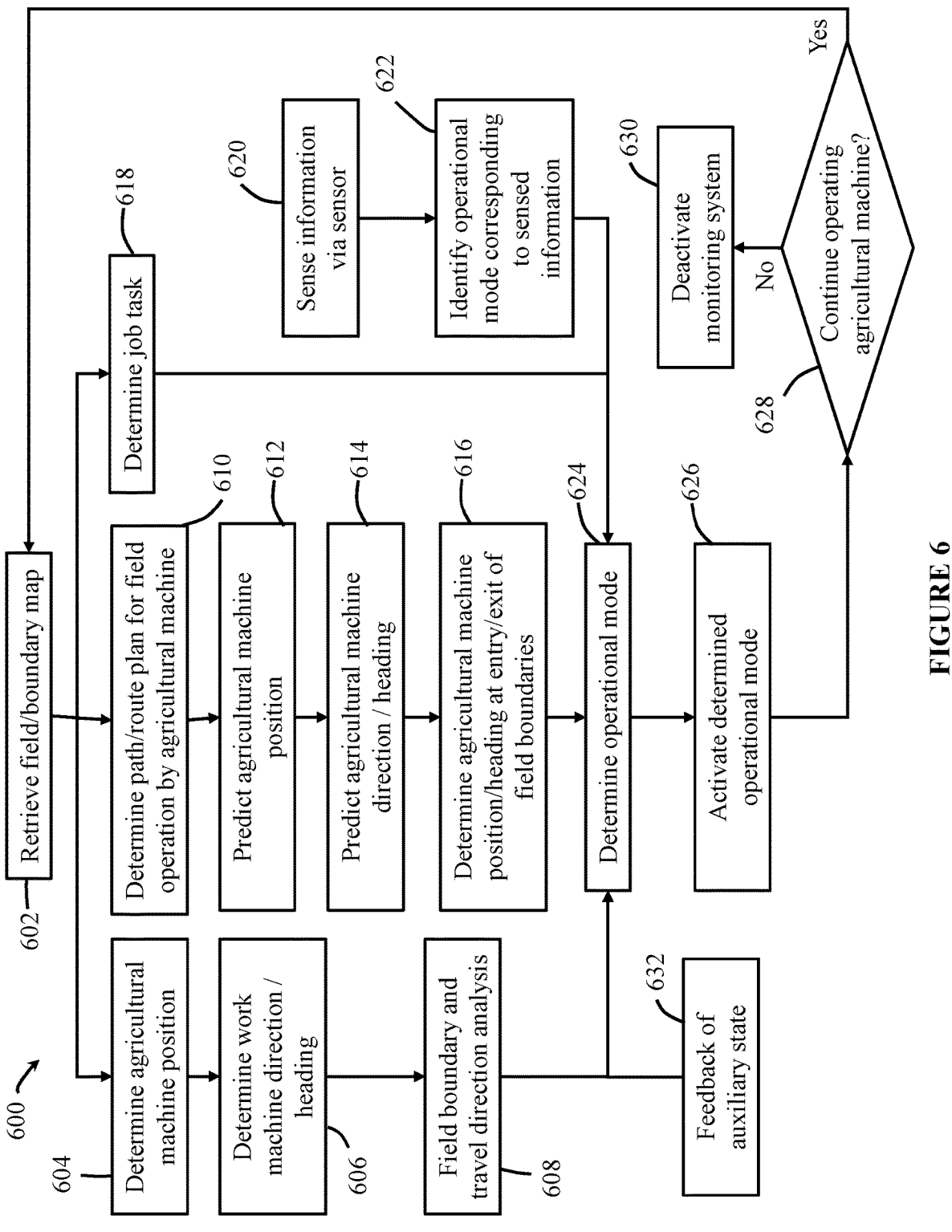
FIG. 6 illustrates an exemplary method for automatically determining an operational mode for an agricultural machine.

FIG. 5 illustrates an exemplary block diagram for automatically determining an operational mode for an agricultural machine 10. A corresponding exemplary method 600 for automatically determining an operational mode for an agricultural machine 10 is illustrated in FIG. 6. The method 600 is described below in the context of being carried out by the illustrated exemplary status monitoring system 100. However, it should be appreciated that method 600 can likewise be carried out by any of the other described implementations, as well as variations thereof. Further, the method 600 corresponds to, or is otherwise associated with, performance of the blocks described below in the illustrative sequence of FIG. 6. It should be appreciated, however, that the method 600 can be performed in one or more sequences different from the illustrative sequence. Additionally, one or more of the blocks mentioned below may not be performed, and the method 600 can include steps or processes other than those discussed below.

As seen by the block diagram shown in FIG. 5, according to certain embodiments, automatically determining an operational mode for an agricultural machine 10 can include various aspects of status monitoring, as indicated by block 500, which can involve a variety of actual and predicted data or information being used, such as, for example, by the controller 102 to determine an operational mode for the agricultural machine 10, as indicated by block 502. Such status monitoring (block 500) can include determining a current position of the agricultural machine 10, as shown in block 504 in FIG. 5.

Status monitoring (block 500 in FIG. 5) relating to determining an actual position of the agricultural machine 10 can include, for example, determining an actual position of the agricultural machine 10 via information provided by at least the guidance system 130, location system 118, or vehicle sensor 115, as well as various combinations thereof, among other information. Determining the actual position of the agricultural machine 10 can further include determining, such as, for example, by the controller 102, travel information of the agricultural machine 10 relative to the boundaries of the either or both the field(s) and roads upon which the agricultural machine 10 may travel, among other locations. Such an analysis can therefore include use of a field boundary map. Accordingly, as illustrated by the exemplary method 600 seen in FIG. 6, to the extent the agricultural machine 10 does not already have a boundary map, at block 602 a field boundary map can be retrieved by the agricultural machine 10. For example, using the communication unit 116, the agricultural machine 10 can retrieve the field boundary map from the secondary device 150.

The field boundary map can provide at least an indication of the location of boundaries for one or more fields in which the agricultural machine 10 is, or is not, to perform an agricultural operation. Additionally, or optionally, the field boundary map can also provide an indication of the location of other areas in which the agricultural machine 10 is, or will be, at or in the vicinity of such as, for example, roads. Further, according to certain embodiments, the field boundary map can provide an indication of locations at which an associated agriculture operation(s) has been performed, if any, as well as an indication of a location(s), if any, at which agricultural operation(s) has not yet been performed. According to certain embodiments, the boundary information can be provided in any form that the controller 102 can utilize to determine an associated location, such as, for example, via use of information from the location system 118. For example, the field boundary map can provide information the controller 102 can utilize to determine a location of the agricultural machine 10 relative to field boundary (ies), among other features identified via information from at least the field boundary map. For example, according to certain embodiments, the field boundary map can include coordinate information, such as, for example, in the form of GPS coordinates that, when considered in connection with information provided by the location system 118, can be used to determine whether the agricultural machine 10 is within, outside of, or approaching a field boundary, as well as the location of the agricultural machine 10 relative to the crop within a field for which the agricultural machine 10 is to perform an agricultural operation.

Figure 7:
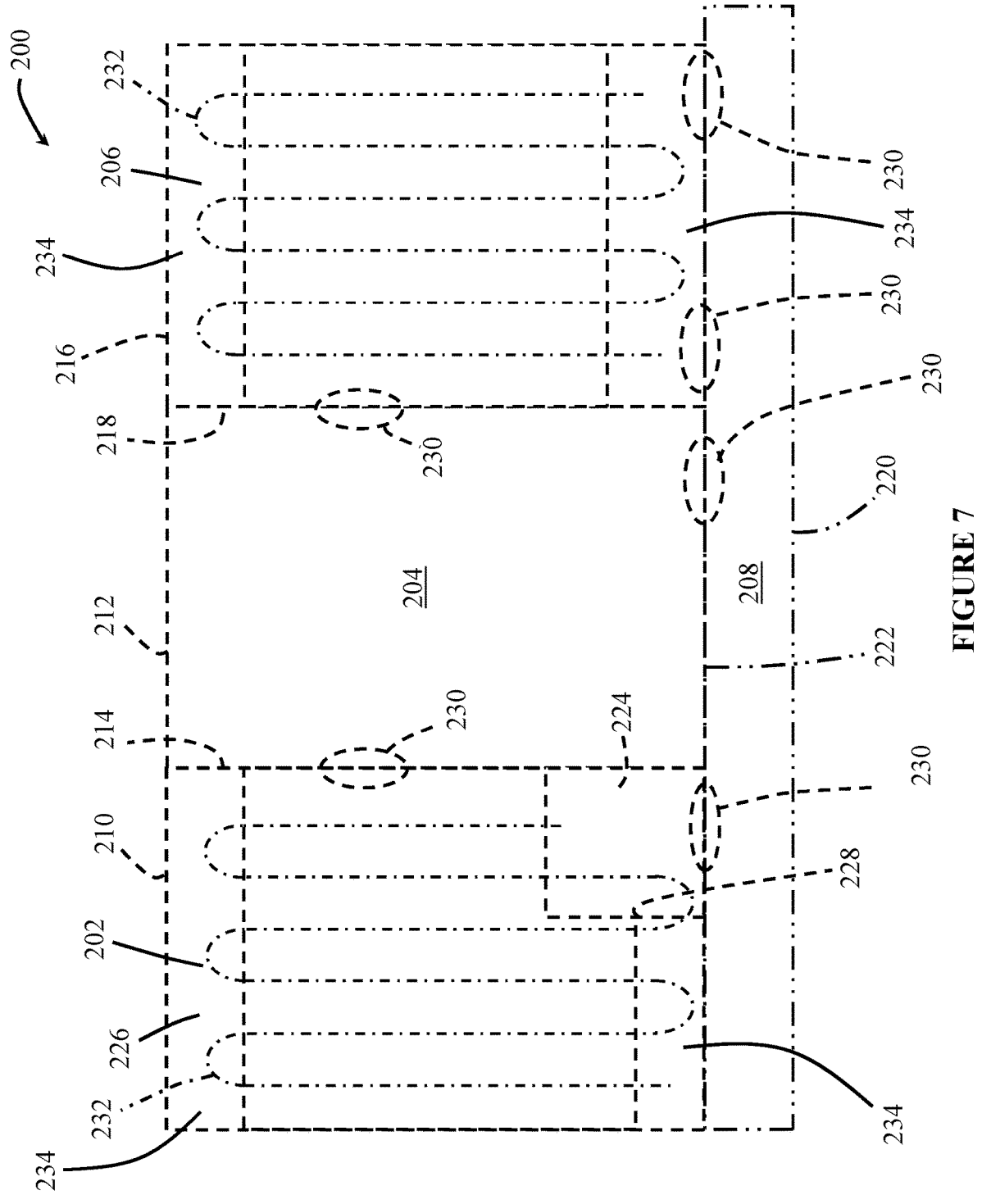
FIG. 7 illustrates a simplified representation of an exemplary field boundary map.

FIG. 7 illustrates a simplified representation of an exemplary field boundary map 200. In the illustrated example, the field boundary map 200 includes location, including boundary, information regarding a first field 202, a second field 204, a third field 206, and a road 208. Thus, in the illustrated example, each of the fields 202, 204, 206 is shown being defined within an associated generally rectangular boundary 210, 212, 216 that generally separates a field 202, 204, 206, from the adjacent field 202, 204, 206. The locations of different portions of each of the boundaries, can be identified by location information, such as, for example, GPS coordinates, which can be provided by the field boundary map 200. Further, in the illustrated example, the first and second fields 202, 204 are positioned such that a portion of the first boundary 210 of the first field 202 is shared with, or otherwise adjacent to, a portion of the second boundary 212 of the second field, 204, as indicated in FIG. 7 by a first shared boundary 214. Similarly, in this example, another side of the second boundary 212 is shared with, or adjacent to, a portion of a third boundary 216 of the third field 206 by a second shared boundary 218. Similarly, the illustrated example also depicts a road boundary 220 being shared with portions of each of the boundaries 210, 212, 216 of the fields 202, 204, 206, as indicated in FIG. 7 by a third shared boundary 222.

With respect to the fields 202, 204, 206 depicted in the illustrated field boundary map 200, the field boundary map 200 can provide job or field status information that indicates, or can be used to determine, a status of an agricultural operation for at least one or more of the fields 202, 204, 206. For example, the job or field status information can indicate an agricultural task has not started, is in progress, or is complete. Thus, with respect to the illustrated field boundary map 200 shown in FIG. 7, for an agricultural operation involving harvesting a crop, for the second field 204 wherein all crop within the field 202 has been harvested, the field status indicator can be harvesting complete. With respect to the illustrated third field 206, wherein a harvesting operation has not yet commenced, the field status indicator can be harvesting not started. Finally, with respect to the first field 202, the first field 202 in FIG. 1 is illustrated as having a first, harvested area 224 in which crop has been harvested, and a second, non-harvested area 226 in which crop material has not been harvested, the first, harvested area 224 being separate from the non-harvested area within the first field 202 by a harvested area boundary 228. Thus, according to such an embodiment, the first field 202 can have a field status indicator of harvesting commenced.

The field boundary map 200 can also include or be used to derive a variety of other information that the controller 102 can utilize to make determinations with respect to the travel of the agricultural machine 10. For example, according to certain embodiments, the field boundary map 200 can include information regarding the location of one or more passageways 230 that can provide either or both entrance points or exit points for the agricultural machine 10 to enter into or out of, respectively, the associated field 202, 204, 206. Such location information can include, for example, coordinates for the passageways 230.

The field boundary map 200 can also include information regarding field 202, 204, 206 or associated crop information that the controller 102 can utilize to determine one or more paths 232 for the agricultural machine 10 to travel while performing an agricultural operation, such as, for example, a harvesting operation. According to certain embodiments, information regarding such paths 232, including, for example, the location of the paths 232 to be followed, and portions of the paths 232 that are positioned in headlands 234, among other portions of the field 202, 206, utilized in connection with performing a turn while engaged in an agricultural operation, can be provided to the guidance system 130. According to certain embodiments, the guidance system 130 can utilize such information in connection with autonomous or semi-autonomous guidance of the agricultural machine 10.

Determining an actual position of the agricultural machine 10 can also include using the location system 118 or guidance system 130, or other information, to identify the current location of the agricultural machine 10, as shown by block 604 in FIG. 6. The information provided at block 604, among other information, including information from the sensor system 108, can also be utilized in connection with determining either or both a direction of travel and heading of the agricultural machine 10. For example, information provided by the vehicle sensor 115 regarding whether the transmission system of the agricultural machine 10 is currently set for the agricultural machine 10 to head in the forward or reverse direction can, in certain embodiments, assist with determining the heading of the agricultural machine 10. With the information from blocks 604 and 606, as well as the information provided by at least the field boundary map 200, the controller 102 can perform a directional analysis in which the controller 102 can determine where the agricultural machine 10 is currently traveling, including relative to features or locations identified from the field boundary map 200. For example, the position and heading information provided at blocks 604 and 606 can, when viewed in connection with one or more features provided by the field boundary map 200, be used by the controller 102 to determine whether that the agricultural machine 10 is traveling to enter into, from the road 208, the first field 202 via the passageway 230 at the road shared boundary 222 between the first field 202 and the road 208. As discussed below, in such an example, such information can be utilized in connection with determining an operational mode, or change in operational mode, for the agricultural machine at block 624, as discussed below. For example, determining the agricultural machine 10 is traveling along a path from the road to a portion of the first field 202 can indicate the operational mode is to change from the transport mode to the field mode. Such travel information, as well as information regarding at least inherent system latencies can also be utilized to determine when the agricultural machine 10 is to being transitioning from the current operational mode to another operational mode.

Referencing FIG. 5, the status monitoring (block 500) can, according to certain embodiments, include the controller 102 determining a predicted position of the agricultural machine 10, as indicated by block 508. Such determination of the predicted position of the agricultural machine 10 can be in addition to, or in lieu of, features relating to the determination of the actual position of the agricultural machine 10, as indicated by block 504 in FIG. 5. Further, as generally indicated by FIG. 5, such a determination of the predicted position of the agricultural machine 10 can include, for example, use of at least information provided to the controller 102 by one or more sensors 110, 112, 114, 115 of the sensor system 108, as generally indicated by block 506 in FIG. 5. Additionally, the prediction of the position of the agricultural machine 10 may also utilize other information, including, for example, information provided by either or both the location system 118 and the guidance system 130, including information indicating the current position of the agricultural machine 10.

A determination of the predicted position (block 504) of the agricultural machine 10 can be attained in a variety of manners. For example, referencing the exemplary method 600 seen in FIG. 6, to the extent not already determined, such a method 600 can include, at block 610, a determination by the controller 102 of a route or path 232 the agricultural machine 10 is to follow while performing an agricultural operation in a field 202, 206. For example, with respect to embodiments in which the agricultural machine 10 is a harvester, the path 232 can include guidelines the agricultural machine 10 is to follow while harvesting crop in the field. The path 232 can further include guidelines for turns that are to be performed in a headland in connection with the performance of the agricultural operation. Additionally, or alternatively, the path 232 can correspond to a path of travel on a road 208 or between fields 202, 204, 206, as well as for travel from a road to a field, and vice versa, among other paths 232.

According to certain embodiments, the path 232 that the agricultural machine 10 is to follow can be determined at block 610 by the location system 118 of the agricultural machine 10. Further, the determination of such a path 232 can be performed using a variety of different information, including, for example, information from the field boundary map 200 that was attained at block 602.

At block 612 and block 614, the controller 102 determines a prediction of a position and a heading, respectively, for the agricultural machine 10. For example, using information relating to one or more of: the current location of the agricultural machine 10, as provided by the guidance system 130; characteristics of the travel of the agricultural machine 10, such as, for example, speed of travel, acceleration, or current heading, as can be provided by information from one or more vehicle sensors 115, as well as any combination thereof, among other information, can be used to predict future positions and headings of the agricultural machine 10. Such information, as well as information provided by the boundary field map 200 can, at block 616, be used by the controller 102 to determine a timing with respect to when the operational mode of the agricultural machine 10 is to change. Moreover, the predicted positional and heading information determined at one or more of at least blocks 612 and 614 can be used to determine the predicted positions of the agricultural machine 10 relative to locations of, or within, the fields 202, 204, 206, as well as relative to the road 208, among other locations. For example, as the agricultural machine 10 travels along a path 232, one or both of the predicted position and heading of the agricultural machine 10 can be used to determine, using at least information from the field boundary map 200, a timing as to when the agricultural machine 10 will reach a passageway 230 so as to exit a field 202, 206 and enter onto the road 208. Thus, such predictive information can indicate a time, including timing, at which the agricultural machine 10 is to be in an operational mode that, in this example, is different than the current operational mode (e.g., change from the field mode to the transport mode). With such timing information, as well as information relating to at least inherent system latencies, the controller 102 can determine when the transition from the current operational mode to the next operational mode, in this example the change from the field mode to the transport mode, is to commence such that at least when the agricultural machine 10 enters the road the agricultural machine 10 is in the transport mode. According to certain embodiments, the information determined at block 616 can be utilized by the controller 102 at block 624 in connection with a determination of the operational mode for the agricultural machine 10, and, moreover, whether the operational mode of the agricultural machine 10 is to change.

Additionally, or alternatively, as indicated by at least block 510 in FIG. 5, according to certain embodiments, determination of the operational mode that the agricultural machine 10 is, or is to be in, can be at least partially based on a job status in terms of a task that the agricultural machine 10 is, or has been assigned, to perform, or the field(s) 202, 204, 206 that the agricultural machine 10 is in, to enter, or traveling along, or combinations thereof. For example, according to certain embodiments, the job status can be a field indicator that indicates a state of a field 202, 204, 206 in terms of at least the type of agricultural operation that is to be performed by the type of agricultural machine 10 utilizing the status monitoring system 100. For example, the field indicator can generally indicate an associated agricultural operation has not started (e.g., operation not started), is in progress (e.g., operation in progress), or is completed (e.g., operation complete). Operation in progress can indicate that the agricultural operation in the field 202 has started, by the agricultural machine 10 or another agricultural machine, but is not yet completed. For example, with respect to a harvesting operation, the first field 202 shown in the field boundary map 200 can have a status of harvesting operation in progress, as the field 202 can have a harvested area 224 in which harvesting is complete, while other portions of the field 202 still remain for harvesting. The field indicator for the second field 204 in FIG. 7 can be operation complete, thereby indicating the crop that was in the second field 202 has already been harvested. Finally, the third field 206 shown in FIG. 7 can have a field indicator of operation not started, as none of the crop in the third field 206 has been harvested.

Additionally, or alternatively, according to other embodiments, the job status can relate to a machine state, as generally indicated by block 506 of the FIG. 5. The machine state can vary for different types of agricultural machines 10 and can provide an indication of at least the current operational mode or the operational mode in which the agricultural machine 10 will be operating, as well as combinations thereof. For example, in the absence of the status monitoring system 100 disclosed herein, an operator can occasionally fail to manually set, or change, the operational mode of an agricultural machine 10. In such situations, the agricultural machine 10 can, for example, inadvertently remain in the transport mode while the agricultural machine 10 performs an agricultural operation. However, certain components of the agricultural machine 10 could, despite the agricultural machine 10 being in the transport mode, be adjusted by selective positioning by the operator to a configuration associated with performing an agricultural machine 10.

Yet, according to an exemplary embodiment such selective positioning of one or more components of the agricultural machine 10 can be utilized by the status monitoring system 100, including the controller 102, to determine a machine state of the agricultural machine 10. Moreover, the positioning or current use of one or more components of the agricultural machine 10 can provide an indication that the agricultural machine 10 is being used or configured for performance of an agricultural operation. For example, instances in which the separating section 44 is engaged, the header system 17 is in a lowered or unfolded position, or the associated operation of the header system 17 can provide an indication to the controller 102 that the agricultural machine 10 is to be in an operational mode associated with performance of an agricultural operation. Thus, in this example, such machine state information can be utilized to determine that the operational mode should be changed from the transport mode to the field mode. Conversely, according to certain embodiments, other information, including, for example, position information regarding the agricultural machine 10 relative to a field 202, 204, 206, road 208, or associated boundaries 210, 212, 214, 216, 218, 220, 222, 228, among other information, can indicate whether, based on the current selected configuration of the component, the agricultural machine 10 is currently in the incorrect operational mode. Such information can be utilized by the controller 102 at block 624, in addition to, or in lieu of, other information provided to the controller 102 to determine the operational mode at which the agricultural machine 10 is to currently be operating.

Additionally, or alternatively, the job status information identified at block 510 in FIG. 5, and shown at block 618 in FIG. 6, can correspond to one or more tasks that are assigned to the agricultural machine 10. For example, according to certain embodiments, an operator, who may be at, or remote from, the agricultural machine 10, can assign the agricultural machine 10 a particular task(s) that the agricultural machine 10 is to perform. Such assigned tasks can be communicated to the controller 102 in a variety of manners, including, for example, via information inputted using an input device 120 or received via the communication unit 116. Such tasks can, for example, relate to transport of the agricultural machine 10 to or along a field, as well as be associated with a particular agricultural operation for the agricultural machine 10 is configurated to perform. At least certain types of tasks can therefore, for example, correspond to harvesting crops, spraying crops, baling crops, or ground tilling, among other types of agricultural operations.

Operational mode determination based on the assigned task(s) for the agricultural machine 10 may, or may not, be independent of information regarding the actual or predicted position of the agricultural machine 10. For example, according to certain embodiments, the assigned task can determine the operational mode in which the agricultural machine 10 is, or will be, operating. According to certain embodiments, the selectable tasks that can be assigned to the agricultural machine 10 can be correlated to a particular operational mode, and moreover, have a predetermined associated operational mode. Thus, in response to receipt of such a task, the controller 102 can be configured to place the agricultural machine 10 in a corresponding predetermined operational mode for performing the assigned task. As a non-limiting example, in response to receipt of an assigned task of harvest, the controller 102 can generate one or more signals to place the agricultural machine in a corresponding operational mode, such as, for example, the field mode. In such an example, the agricultural machine 10 can then remain in the field mode, including if the agricultural machine 10 crosses a road 208 between fields, and, moreover, can remain the field mode until the agricultural machine 10 receives another assigned task that has a different corresponding predetermined operational mode. Further, according to other embodiments, the assigned task may be one factor in the determination of the operational mode at which the agricultural machine 10 is to operate. For example, other considerations can influence the determination by the controller 102 as to the selection of the operational mode for the agricultural machine 10 in addition to the assigned task, such as, for example, a location of the agricultural machine 10 relative to one or more fields 202, 204, 206 or boundaries 210, 212, 216; the presence, if any, of internal or external obstacles; or a harvested or non-harvested status of the field 202, 204, 206 upon which the agricultural machine 10 is, or will be, traveling, among other considerations.

Additionally, or alternatively, according to certain embodiments, the assigned task can be associated with a location of the agricultural machine 10, including a location of the agricultural machine 10 relative to the location of one or more features identified by, for example, the field boundary map 200. For example, the controller 102 can receive instructions indicating that when the agricultural machine 10 is at a particular location, the agricultural machine 10 is to perform a particular, assigned task. Such assigned tasks can again be associated with at least one of a plurality of operational modes. Thus, for example, the controller 102 can receive instructions that the agricultural machine 10 is to travel across the second field 204 to the third field 206 without performing an agricultural operation within the second field 204. Thus, when the agricultural machine 10 is, or is about to be, within the boundary lines 212 of the second field 204, the controller 102 can identify the assigned task, namely travel, as being associated with the transport mode. Accordingly, at the appropriate time, the controller 102 can generate one or more signals to have the agricultural machine 10 in the transport mode at least when the agricultural machine 10 is in, or enters into, the second field 204. However, as mentioned above, a variety of other criteria can also be considered by the controller 102 in addition to the assigned task when making the determination of the operational mode at which the agricultural machine 10 is to operate. For example, in certain instances, the presence of one or more internal or external obstacles may influence the controller 102, regardless of the assigned task, not to change the operational mode of the agricultural machine 10, so that the profile, including overall width, of the agricultural machine 10 is, at least currently, not adjusted. Additional criteria that can be considered in determining whether the agricultural machine 10 should, or should not, change the operational mode can include, for example, one or more of the distance or time before the agricultural machine 10 will reach or cross the boundary line between the fields, the absence or presence of internal or external obstacles, or a presence of field issues (e.g., topography) that may present issues when traveling at certain elevated speeds, as well as combinations thereof, among other criteria.

Referencing FIG. 5, the block associated with machine state and sensor data (block 506) can, according to certain embodiments, utilize one or more sensors 110, 112, 115 of the sensor system 108 for a determination of the operational mode of the agricultural machine 10. For example, as seen in FIG. 6, according to certain embodiments, at block 620 one or more sensors, such as, for example the dynamic sensor 112, can detect, including measure, information that the controller 102 utilizes at block 622 to identify a corresponding operational mode. For example, according to embodiments in which the dynamic sensor 112 includes a vibration sensor, vibration information attained via the vibration sensor can be communicated to the controller 102. Such vibration information provided via the vibration sensor can be compared to one or more predetermined thresholds, including ranges, which correspond to one or more operations or tasks being performed by the agricultural machine 10. For instance, a first predetermined threshold can correspond to vibrations anticipated to be detected by the vibration sensor when the agricultural machine 10 is traveling along a road 208 or traveling along a road 208 at a certain speed or range of speeds. Another, second predetermined threshold can relate to a range of vibrations anticipated to be detected by the vibration sensor as the agricultural machine 10 travels across a field, while another, or third predetermined threshold can relate to a range of vibrations anticipated to be detected by the vibration sensor as the agricultural machine 10 performs an agricultural operation. While the foregoing discusses an example involving a dynamic sensor 112 in the form of a vibration sensor, a similar approach can be utilized with other, or additional, dynamic sensors 112, including, but not limit to accelerometers, among other sensors.

Alternatively, or additionally, at block 620, the optical sensor 114 can be used to obtain one or more images or video that capture at least a portion of the area or environment in which the agricultural machine 10 is located. According to such embodiments, the controller 102 can, at block 622, analyze the information captured by the optical sensor 114, such as, for example, via use of image recognition or other machine vision or identification, as previously discussed, to identify or recognize objects within the captured information. Such recognition of objects, including, but not limited to, one or more of roads, asphalt, gravel, buildings, crop, equipment, or ground surface, as well as combinations thereof, in the area or vicinity of the agricultural machine 10 can be used by the controller 102 to identify a relative location of the agricultural machine 10. Moreover, from recognition of information in the captured information, at block 622, the controller 102 can, for example, determine, including predict, if the agricultural machine 10 is, or is about to be, in or traveling along a field that contains a crop material that is to be harvested, traveling along a field in which crop material has already been harvested (e.g., an already harvested area 224), approaching a passageway 230, or traveling along a road 208, among other locations.

Additionally, or alternatively, at block 632 one or more auxiliary sensors 110 can provide feedback information that can indicate a state, including position, orientation, or configuration, as well as combinations thereof, among other information, of one or more auxiliary devices 126, Such feedback information can indicate an operational mode at which the operator is actually operating the agricultural machine 10, regardless of whether the agricultural machine 10 is actually in that operational mode. For instance, the open or closed state of the grain tank 51, raised or lowered or rotational position of the ladder 21, open or closed state of the air scoop 47, folded or unfolded state of one or more wings or extensions of a frame, folded or unfolded state of the unloading conveyor 32, folded or unfolded position of a head or auger, or position of one or more components of header system 17, among other positions of auxiliary devices 126, including extended or retracted positions, either individually or in various combinations with each other, can provide an indication of the operational mode at which the agricultural machine 10 is to be operated.

Using at least the information attained from one or more, if not all, of at least blocks 608, 616, 618, 622, or 632, as well as various combinations thereof, the controller 102 can, at block 624, determine either, or both, the operational mode that that the agricultural machine 10 is, or will be, operating. Such a determination at block 624 can also include determining a timing as to when the operational mode of the agricultural machine 10 is to change, including when a transition from one operational mode to another operational mode is to commence. Such timing can involve a variety of considerations, including the distance from a location at which the agricultural machine 10 is to be operating in the other operational mode, the rate of travel of the agricultural machine 10, and inherent system latencies regarding the speed at which the agricultural machine 10 can change from the current operational mode to the other operational mode, among other considerations.

As discussed above, the operational modes can include, for example, a transport mode and a field mode. Another operational mode can also include a "machine is on road" mode, which corresponds to the agricultural machine 10 currently being located on a road, wherein the configuration and settings of the agricultural machine 10 can be similar to those for the transport mode. Similarly, an additional operational mode can be a "machine is on field" mode, which corresponds to the agricultural machine 10 currently being located on a field, wherein the configuration and settings of the agricultural machine 10 can be similar to those for the field mode.

Other operational modes can, for example, include operational modes in which the agricultural machine 10 transitions from one of the transport mode and the field mode to the other of the transport mode or the field mode. For example, an operational mode can include transitioning from the field mode to the transport mode, wherein the agricultural machine 10 is in the process of changing from the configuration and settings associated with the field mode to the configuration and settings associated with the transport mode. Similarly, another exemplary operational mode can include transitioning from the transport mode to the field mode, wherein the agricultural machine 10 is in the process of changing from the configuration and settings associated with the transport mode to the configuration and settings associated with the field mode.

Another exemplary operational mode can be a crossing field mode, also referred to as a field cruise mode, wherein, while the agricultural machine 10 is within a field boundary 210, 212, 216 of a field 202, 204, 206, the agricultural machine 10 may not be engaged in an agricultural operation. For example, with respect to the illustrated field boundary map 200, the agricultural machine 10 can be in the crossing field mode as the agricultural machine 10 travels across the second field 204 to either one of the first and third fields 202, 206. In certain embodiments, the crossing field mode can correspond to instances in which the field 204 upon which the agricultural machine 10 is crossing has a field status indicator of job complete, including, for example, harvest complete. As the agricultural machine 10 is not engaged in an agricultural operation while in the crossing field mode, the agricultural machine 10 can have a configuration or settings generally similar to the transport mode, which may be beneficial with at least respect to the speed at which the agricultural machine 10 travels along the field. However, compared to at least the transport mode, according to certain embodiments, the crossing field mode can at least partially differ with respect to settings that may account for the variance in the terrain in the field 202, including potential variances in elevation in the field 202.

Further, the crossing the field mode can also take into consideration either or both identified internal and external obstacles. In such instances, while the agricultural machine 10 may be operated in the transport mode, one or more components, including auxiliary devices 126, can be at a state, including position or orientation, that is different than the state associated with the transport mode for that component. More specifically, the controller 102 can instead have such components at another state that provides at least the portion of the agricultural machine 10 associated with that component having a profile that may avoid contact or interference between the agricultural machine and the identified obstacle. Thus, in at least certain instances, at least one component of the agricultural machine 10 can be selectively placed in a state, including, for example, position, orientation, or configuration, that, for at least that component, is associated with a particular operational mode, while at least another component of the agricultural machine 10 can be selectively in a state that, for that other component, is associated with another, or different operational mode. Accordingly, in certain instances, two or more components of the agricultural machine 10 can be in states that are associated with different operational modes.

Another exemplary operational mode can be machine crossing road mode. The machine crossing road mode can correspond to instances in which the agricultural machine 10 is in the field mode but will be temporarily crossing outside of a field boundary 210, 212, 216. In such instances, the machine crossing road mode can be configured to maintain the agricultural machine 10 in the field mode despite the agricultural machine 10 traveling outside of a field 202, 204, 206. For example, the agricultural machine 10 may cross a road 208 while traveling between fields on opposing sides of the road 208. Thus, the machine crossing road mode can be utilized to maintain the agricultural machine 10 in the field mode while the agricultural machine 10 crosses such a road 208.

At block 626, the controller 102 can generate one or more signals to implement the operational mode that was determined at block 624. As previously mentioned, the implementation of the determined operational mode can be timed such that the transition from the current operational mode to the next operational mode can begin at a time that accommodates for at least inherent system latencies, particularly in view of a rate of travel and relative location of the agricultural machine 10. Thus, the activation at block 626 can begin at a time at which the transition from the current mode to the next operational mode will be completed by the time the agricultural machine 10 is at a location or position that is to be associated with that operating the agricultural machine 10 in that next operational mode.

The method 600 can generally continuously monitor for a possible change in the operational mode while the agricultural machine 10 is in operation. Thus, for example, at block 628 the controller 102 can determine whether operation of the agricultural machine 10 is, or is not, to continue. If operation of the agricultural machine 10 is not to continue, then at block 630 the monitoring system 100 can be deactivated. However, if the agricultural machine 10 is to continue operating, then method 600 can return to block 602 if an updated field boundary map 200 is to be used, otherwise the method 600 can return to any one, if not all, of blocks 604, 610, 618, 620, and the method 600 can again be repeated.

Figure 8:
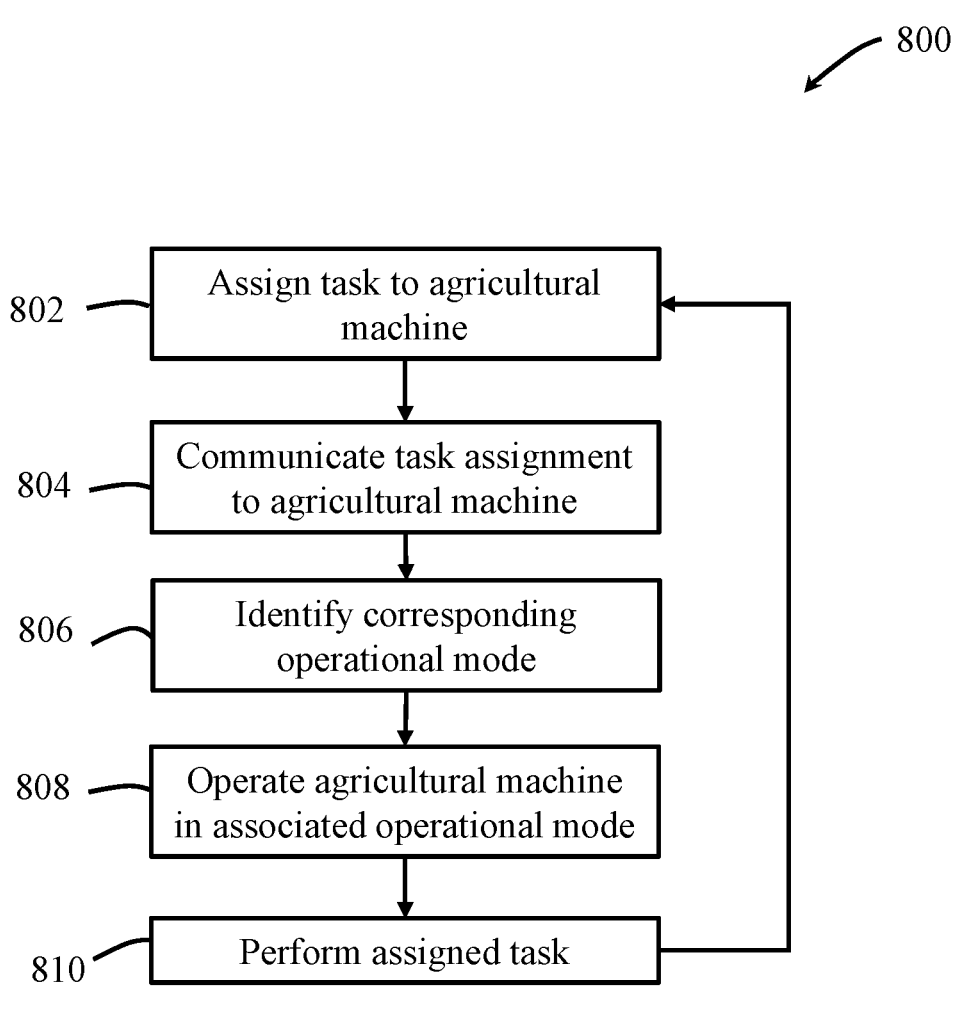
FIG. 8 illustrates another exemplary method for automatically determining an operational mode for an agricultural machine.

FIG. 8 illustrates another exemplary method 800 for automatically determining an operational mode for an agricultural machine 10. The method 800 is described below in the context of being carried out by the illustrated exemplary status monitoring system 100. However, it should be appreciated that method 800 can likewise be carried out by any of the other described implementations, as well as variations thereof. Further, the method 800 corresponds to, or is otherwise associated with, performance of the blocks described below in the illustrative sequence of FIG. 8. It should be appreciated, however, that the method 800 can be performed in one or more sequences different from the illustrative sequence. Additionally, one or more of the blocks mentioned below may not be performed, and the method 800 can include steps or processes other than those discussed below.

The method 800 shown in FIG. 8 provides a manner of automatically setting the operational mode for the agricultural machine 10 based on a corresponding task assigned to the agricultural machine 10. For example, according to certain embodiments, the controller 102 can be, or include, a master logistics controller that can be used in connection with an operational manager at a location remote to the agricultural machine 10 assigning, from a plurality of selectable tasks, a particular task to the agricultural machine 10, as indicated at block 802. According to such an embodiment, the controller 102 can also include a controller at the agricultural machine 10 that can, at block 804, receive the assigned task, including, for example, via one or more signals communicated from the secondary device 150 that are received by the communication unit 116. However, the task can be assigned and communicated to the controller 102, including a controller at the agricultural machine 10, in a variety of other manners. For example, according to other embodiments, the task can be assigned by an operator utilizing one or more input devices 120 at the agricultural machine 10 and communicated to a controller 102 at least at the agricultural machine 10.

A variety of different types of tasks can be assigned for the agricultural machine 10. For example, similar to one or more of the embodiments discussed above with respect to at least block 618 of the method 600 shown in FIG. 6, the tasks can include one or more operations that the agricultural vehicle 10 is configured to perform in connection with performance of an agricultural operation. For example, for different types of agricultural machines, the assigned task can relate to harvesting crops, spraying crops, tilling soil, and baling crops, among other tasks relating to performance of an agricultural operation. The tasks can also relate to a task(s) other than performance of an agricultural operation, including, for example, travel along roads 208 and across fields 204, among other tasks.

According to certain embodiments, the controller 102, including for example, the memory device 106 can store information that associates at least one of a plurality of operational modes to each assignable task. Thus, following receipt of the assigned task, the controller 102 can identify, at block 806, a corresponding operational mode at which the agricultural machine 10 is to be operated while performing the assigned task. For example, with respect to a task assignment relating to an agricultural operation, the controller 102 can identify, at block 806, an associated predetermined operational mode for that assigned task.

At block 808, to the extent the operational mode identified at block 806 is different than the current operational mode of the agricultural machine 10, the controller 102 can generate one or more signals to facilitate the agricultural machine 10 changing to the identified operational mode. Accordingly, with the agricultural machine 10 being configured to perform the assigned task in the associated operational mode, performance of the assigned task can occur at block 810. Further, the method 800 can be repeated in connection with a new, different task being assigned to the agricultural machine 10, or until operation of the agricultural machine 10 is to, at least temporarily, cease.

FIG. 9 illustrates another exemplary method 900 for automatically determining an operational mode for an agricultural machine 10. The method 900 is described below in the context of being carried out by the illustrated exemplary status monitoring system 100. However, it should be appreciated that method 900 can likewise be carried out by any of the other described implementations, as well as variations thereof. Further, the method 900 corresponds to, or is otherwise associated with, performance of the blocks described below in the illustrative sequence of FIG. 9. It should be appreciated, however, that the method 900 can be performed in one or more sequences different from the illustrative sequence. Additionally, one or more of the blocks mentioned below may not be performed, and the method 900 can include steps or processes other than those discussed below.

At block 902, to the extent not already activated, the status monitoring system 100 can be activated. At block 904, the agricultural machine 10 can proceed to operate in a first operational mode, such as, for example, the transport mode or the field mode, among other operational modes. During operation of the agricultural machine 10, information can be obtained at block 906 from one or more sensors 110, 112, 114, 115 of the sensor system 108. Such capturing of information at block 906 can be similar to at least above discussed block 620 of the method 600 shown in FIG. 6. For example, according to certain embodiments, at least one dynamic sensor 112 or the optical sensor 114, or both, can provide information to the controller 102 that is detected by the sensor 112, 114 during operation of the agricultural machine 10. As previously discussed, a variety of sensors can be utilized as a dynamic sensor 112 to gather information regarding the travel or motion of the agricultural machine 10, including, for example, either or both a vibration sensor and accelerometer, among other dynamic sensors 112.

At block 908, the information provided by the one or more sensors 110, 112, 114, 115 of the sensor system 108 can be used by the controller 102 to determine the operational mode in which the agricultural machine 10 should currently be operating. Moreover, the sensed information can be identified by at least the controller 102 as corresponding to predetermined sensed information that is anticipated to be obtained, including measured, while the agricultural machine 10 is to be operating in a particular mode, or, alternatively, performing a particular task, regardless of the actual operational mode in which the agricultural machine is currently operating. For example, the information provided at block 906 can be within a predetermined threshold, including a range, of values anticipated to be detected when the agricultural machine 10 is operating in a first operational mode, or performing a task associated with the first operational mode, regardless of which operational mode the agricultural machine 10 is actually currently operating. Further, the analysis at block 908 can be similar to at least the analysis discussed above with respect to block 622 of the method 600 shown in FIG. 6.

Additionally, or alternatively, according to certain embodiments, the information provided by the sensor system 108, including, from one or both of the dynamic sensor 115 and the optical sensor 114, can be utilized at block 908 to identify a location, or location type, at which the agricultural machine 10 is located or operating. For example, information provided at block 906 can be used by the controller 102, including, for example, compared to the predetermined thresholds, as discussed above with respect to at least block 622, to identify if the agricultural machine is on a road or in a field 202, 204, 206, among other locations. Such derived location information can also be used in connection with determining which operational mode the agricultural machine 10 should be operating. Such information captured by the sensor system 108 can also be used to confirm other information or determinations made by the processor 104. For example, information captured by an optical sensor 114 or dynamic sensor 112 indicative of the agricultural machine 10 being either on a road or in a field can be compared, including used to confirm, other determinations regarding the actual position of the agricultural machine 10, such as, for example, to confirm determinations made at block 604.

At block 910, using the operational mode determined at block 908, as well as an identification of the operational mode in which the agricultural machine 10 is currently operating, the controller 102 can determine whether the operational mode is to be changed. Such a determination can, for example, be based on at least a determination that the current operational mode is different than the operational mode identified at block 908 from at least the information provided at block 906. If the operational mode is determined by the controller 102 not to be changed, then the method 900 can return to block 906, where one or more of the sensors 110, 112, 114, 115 can continue to provide information that the controller 102 can, at blocks 908 and 910, continue to analyze and use to determine whether to change the operational mode of the agricultural machine 10.

If, however, the controller 102 determines at block 910 to change the operational mode, then the controller can, at block 912, generate one or more signals to facilitate the agricultural machine 10 being placed in the operational mode that was identified using at least the sensed data at block 908. Further, as indicated by at least block 914, if the status monitoring system 100 is to continue to be activated, the method 900 can return to block 906, wherein additional sensor 110, 112, 114, 115 information can be obtained for further determinations regarding whether to continue with, or change, the current operational mode of the agricultural machine 10. Otherwise, if the status monitoring system 100 is be deactivated at block 910, such deactivation can occur at block 916.

Figure 10:
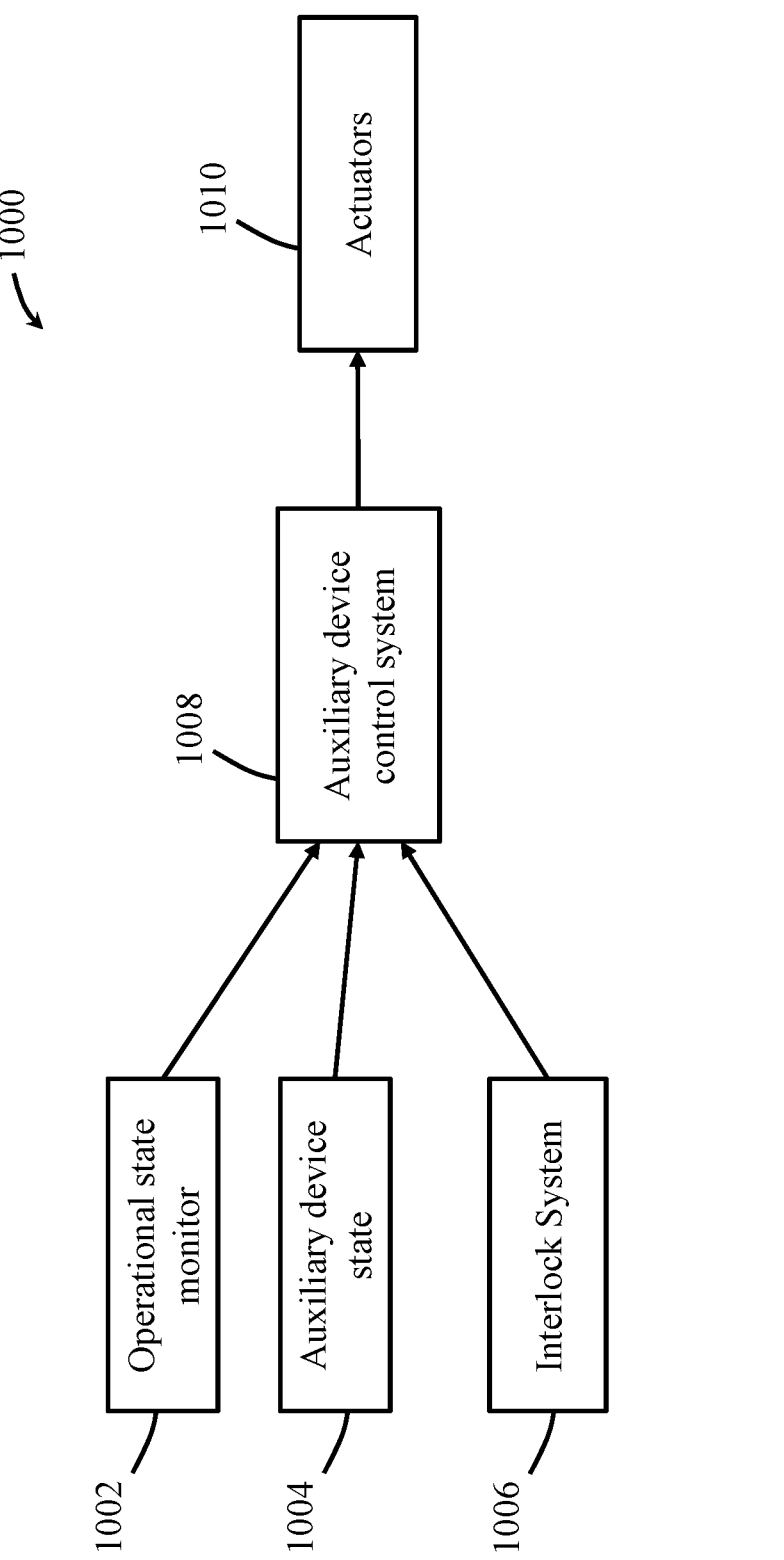
FIG. 10 illustrates an exemplary block diagram of a simplified representation of an approach to determine whether to change operational modes based, at least in part, on information regarding a state of one or more auxiliary devices.

FIG. 10 illustrates an exemplary block diagram of a system 1000 for automatically determining an operational mode for an agricultural machine 10. An example of the approach depicted in FIG. 10 is illustrated by the exemplary method 1100 shown in FIG. 11. The method 1100 is described below in the context of being carried out by the illustrated exemplary status monitoring system 100. However, it should be appreciated that method 1100 can likewise be carried out by any of the other described implementations, as well as variations thereof. Further, the method 1100 corresponds to, or is otherwise associated with, performance of the blocks described below in the illustrative sequence of FIG. 11. It should be appreciated, however, that the method

1100 can be performed in one or more sequences different from the illustrative sequence. Additionally, one or more of the blocks mentioned below may not be performed, and the method 1100 can include steps or processes other than those discussed below.

Figure 11:
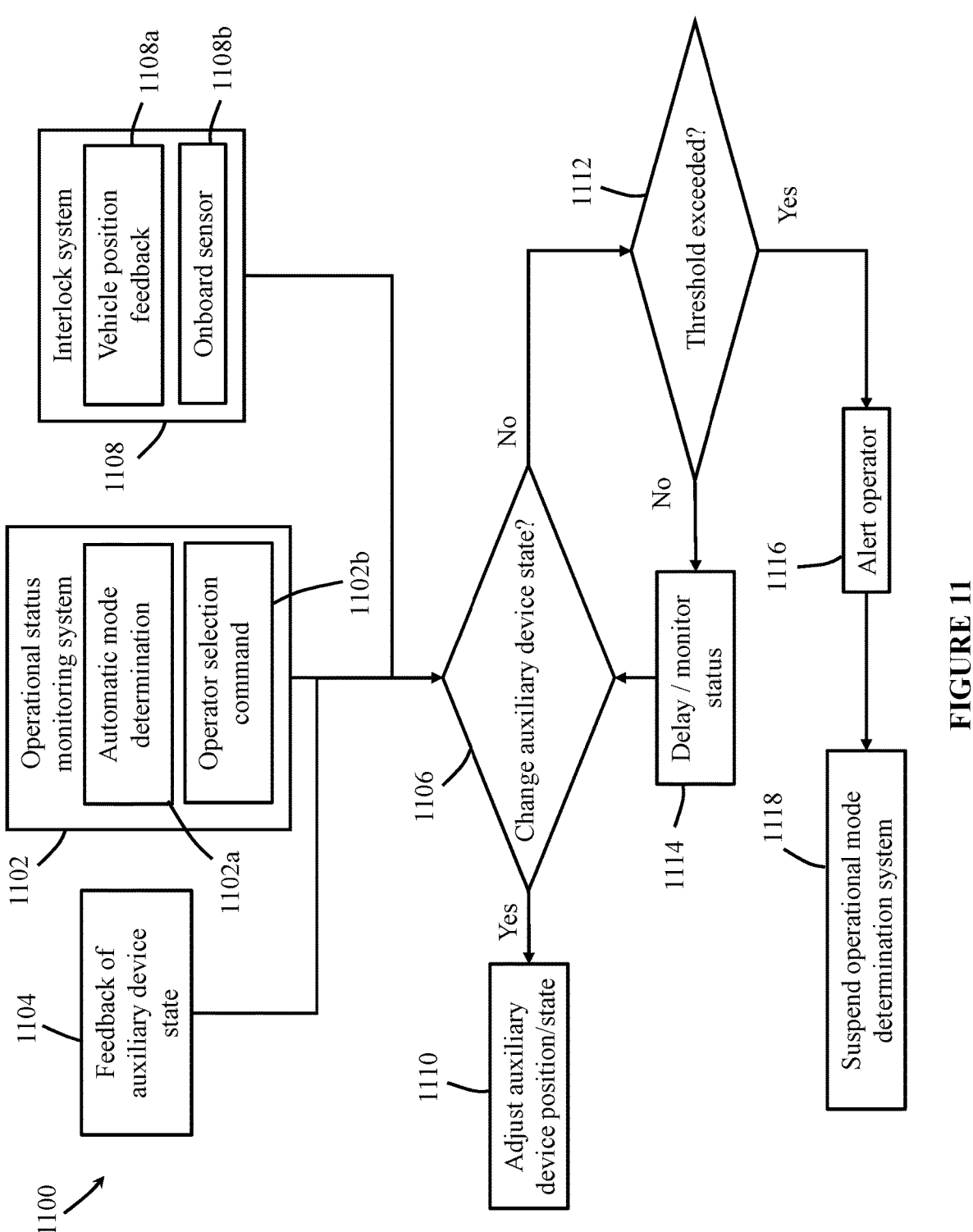
FIG. 11 illustrates another exemplary method for automatically determining whether to change operational modes based, at least in part, on information regarding a state of one or more auxiliary devices.

As generally indicated by block 1002 in FIG. 10, as well as the method 1100 shown in FIG. 11, the status monitoring system 100 can again be utilized to determine the operational mode the agricultural machine 10, including determining the operational mode the agricultural machine 10 currently is operating in, should be operating in, or will be transitioning to for operation, as well as various combinations thereof. Thus, for example, at block 1102, and more specifically, at block 1102a in FIG. 11, the method 1100 can utilize any one of the foregoing methods 600, 900, or associated approaches, to automatically identify an operational mode of, or for, the agricultural machine 10. Alternatively, as indicated by block 1102b, according to certain embodiments, the operational mode can correspond to a task assigned to the agricultural machine 10 by an operator 1102b, including via use of an input device 120 of the agricultural machine 10 or a remote master logistics controller, as discussed above, for example, with respect to at least the method 800 depicted in FIG. 8.

One or more of the operational modes can be associated with at least one auxiliary device 126 being in a state, including position, orientation, or configuration, as well as combinations thereof, that is different than the state for the auxiliary device 126 for at least one other operational mode. Further, the state of the auxiliary devices 126 for one or more of the operational modes can be predetermined, and can be stored, for example, by the memory device 106. For example, the state of the grain tank covers 51 while the agricultural machine 10 is in the transport mode can be different than the state of the grain tank covers 51 while the agricultural machine 10 is in the field mode. Thus, a determination of the operational mode at block 1102 can further include determining, including, identifying, for that operational mode the corresponding state for one or more, if not all, of the auxiliary devices 126. Accordingly, in at least certain instances, the state of one or more auxiliary devices 126 can be adjusted in association with a change to an operational mode.

The method 1100 can thus assist in identifying which auxiliary devices 126 currently are, or are not, in a state that may require an adjustment based on a change in the operational mode of the agricultural machine 10. For example, as indicated by block 1004 in FIG. 10, and block 1104 in FIG. 11, the controller 102 can utilize feedback information regarding the states of at least certain auxiliary devices 126 of the agricultural machine 10 in association with, or in parallel to, determinations regarding the operational mode of the agricultural machine 10. According to certain embodiments, such feedback information can correspond to information provided to the controller 102 from one or more auxiliary sensors 110, as previously discussed. For example, according to embodiments in which the auxiliary device 126 includes the ladder 21, as discussed above with respect to FIGS. 2A and 2B, such feedback information from the auxiliary sensor 110 can be used by the controller 102 to determine the current state of the ladder 21, such as, for example, whether the ladder 21 is in the first, lowered position, the second, raised position, or a position therebetween.

Such state information for one or more of the auxiliary devices 126 can also be utilized by the controller 102 to determine a machine configuration identifier for the agricultural machine 10. Each machine configuration identifier can correspond to a different outer profile of at least a portion of the agricultural machine 10. Thus, different states for one or more auxiliary devices 126 can contribute to differences in the machine configuration identifier. Accordingly, as different auxiliary devices 126, or different combinations of auxiliary devices 126, can have different states for at least some different operational modes, the machine configuration identifier can be different for different operational modes. The machine configuration identifiers can therefore include a plurality of machine configuration identifiers, with each machine configuration identifier being different with respect to at least a size, configuration, or shape of at least a portion of the agricultural machine 10. Additionally, or alternatively, each machine configuration identifier can correspond to an area(s) or space(s) being, or will be, occupied by the agricultural machine 10 in view of either or both the current and upcoming adjusted states of one or more of the auxiliary devices 126 that can be associated with different operational modes.

Therefore, while the above example discussed changes in the state of an auxiliary device 126 in the form of the ladder 21, similar determinations as to a state of an auxiliary device 126, and the associated machine configuration identifier, can also be made using feedback information relating to other auxiliary devices 126, including, for example, the grain tank covers 51, air scoop 47, foldable portions of the unloading conveyor 32, or at least portions of the header system 17. With respect to the header system, 17, the associated auxiliary device(s) 126 and the corresponding states of those auxiliary device(s) 126 can vary for different types of agricultural machines 10. For example, with respect to certain agricultural machines 10, an auxiliary device 126 can correspond to a position of a reel of the header system 17, as well as the folded and unfolded positions of wings the frame of the header system 17, as previously discussed.

Using predetermined information regarding the state the auxiliary devices 126 for the operational mode identified at block 1102, and information regarding the current state of the auxiliary devices 126 from block 1104, the controller 102 can, at block 1106, determine whether to adjust the state of one or more auxiliary devices 126, or adjust the corresponding machine configuration identifier. Moreover, such a determination by the controller 102 can be based on whether the current state of an auxiliary device(s) 126 does, or does not, correspond to the predetermined state for that auxiliary device(s) 126 that is associated with the identified operational mode. Thus, for example, if the agricultural machine 10 is identified at block 1102 to be operated in an operational mode wherein the grain tank covers 51 are to be in the closed position, and the feedback information from block 1104 indicates the grain tank covers 51 are currently not closed, then at block 1106 the controller 102 can determine that the grain tank covers 51 are to be closed. The method 1100 can then proceed to block 1110, wherein the controller 102 can generate one or more signals to facilitate an adjustment in the state of the auxiliary device 126, which, in this example, is to close the grain tank covers 51. Thus, for example, the controller 102 can, at block 1110, generate one or more signals to operate an actuator 128 to cause an adjustment in the state of the associated auxiliary device 126.

In certain instances, the controller 102 can receive a feedback signal, such as, for example, from an auxiliary sensor 110 associated with the adjusted auxiliary device 126 confirming the state of the auxiliary device 126 has at block 1110 been adjusted. Further, according to certain embodiments, if adjustment of the auxiliary device 126 is unsuccessful, the controller 102 can continue to attempt to facilitate an adjustment in the state of the auxiliary device 126 until the state of the auxiliary device 126 is successfully adjusted, or a threshold number of attempts to adjust the auxiliary device 126 has been reached. In the event the threshold number of attempts is reached without successfully adjusting the auxiliary device 126 to the identified state, the controller 102 can generate a signal to facilitate an output of an alert via the output device 122 for the operator.

While the feedback information provided at block 1104 can be used to determine that the state of the auxiliary device 126, or corresponding machine configuration identifier, is to be adjusted in view of the operational mode identified at block 1102, in certain instances other factors may indicate that such an adjustment should not, at least temporarily, occur. For instance, a machine configuration identifier associated with an identified operational mode identified at block 1102 can indicate the grain tank covers 51 are to be opened. Based on such information, the controller 102 can typically determine that one or more signals should be generated to facilitate operation of an associated actuator 128 to open the grain tank covers 51. Yet, at that time, the agricultural machine 10 may be at a position at which such a change in the state of the grain tank covers 51 could be problematic. For example, a power line, tree branch, or other structure could presently be positioned above the grain tank covers 51 that could interfere with the opening of the grain tank covers 51.

To address such situations, according to certain embodiments, the determination by the controller 102 at block 1106 as to whether to adjust a state of an auxiliary device 126 can include further consideration of additional information or factors. For example, in the illustrated embodiment, additional information relating to the conditions of the agricultural machine 10 or environment around the agricultural machine 10, or combinations thereof, can be monitored at block 1108 via use of an interlock system 132 (FIG. 4), as also generally indicated by block 1006 in FIG. 10.

The interlock system 132 can include one or more onboard sensors 1108b that can detect or be used to predict the presence of obstructions or obstacles around the agricultural machine 10, including in a path of an auxiliary device 126. Such obstructions can include generally static obstacles, such as, for example, power line, poles, trees, fences, and buildings, among other structures. Further, such obstacles can also include generally non-static obstacles, such as, for example, other agricultural machines, equipment, vehicles, people, animals, or other components of the agricultural machine 10, among other objects that typically at least periodically undergo a change in position or configuration. The type of onboard sensors 1108b that can detect such static and non-static obstacles can vary, and can include, or be different than, the previously discussed sensors 110, 112, 114, 115 of the sensor system 108. For example, according to certain embodiments, the optical sensor 114 can, with respect to at least the interlock system 132, be a device that can capture information regarding such obstacles, including via use of radar, lidar, pictures, images, or video, or any combination thereof. Additionally, or alternatively, the interlock system 132 can utilize one more position sensors, proximity sensors, or presence sensors to detect the presence of obstacles in the vicinity of the agricultural machine 10.

The interlock system 132 can also be configured to use information from the onboard sensors 1108b, among other information, to determine the position of the agricultural machine 10 relative to at least certain obstacles. For example, as generally indicated by block 1108_a_ in FIG. 11, in addition to, or in lieu of, information provided by the onboard sensors 1108_b_, the interlock system 132 can utilize feedback information from other vehicles or equipment to determine a position of the agricultural machine 10 relative to those other vehicles or equipment. Such positional feedback information can be provided directly to the agricultural machine 10, such as, for example, via the communication unit 116, or can be derived by the controller 102, including, for example, from one or more maps obtained by the controller 102.

As indicated by FIG. 10, features relating to the operational mode determination, including, for example, the status monitoring system 100 (generally block 1002 in FIG. 10), the above-discussed features relating to the determination of the state of the auxiliary device(s) (generally block 1004 in FIG. 10), and the interlock system 132 (as also indicated by block 1006 in FIG. 10), can contribute to an auxiliary device control system 1008. Moreover, using such information relating to the identified operational mode, the associated machine component identifier or associated state(s) of an auxiliary device(s) 126, feedback information regarding the current state of one or more auxiliary devices 126, or information from the interlock system 132, as well as various combinations thereof, the controller 102 can determine at block 1106 whether to adjust a state of an auxiliary device(s) 126. If the controller 102 determines to adjust the state of one or more auxiliary devices 126, then such adjustment(s) can proceed at block 1110, as previously discussed, such as, for example, via actuation of one or more actuators (as generally indicated by block 1010 in FIG. 10).

If, however, the controller decides at block 1106 to, at this time, not adjust a state of an auxiliary device 126, a counter that tracks how many consecutive times the controller 102 has elected to not adjust the auxiliary device 126 can be incremented. Moreover, following a decision at block 1106 not to adjust a state of an auxiliary device(s) 126, the controller 102 can determine whether a threshold number of decisions to not adjust the auxiliary device 126 has been exceeded. If the controller 102 determines at block 1112 that the threshold has not been exceeded, then, according to certain embodiments, at block 1114, the controller 102 can delay for a predetermined time before reevaluating whether to proceed with adjusting the state of the auxiliary device(s) 126 at block 1106. Such a reevaluation at block 1106 can include evaluating whether the interlock system 1108 has subsequently provided information indicating that the issue with the previously detected obstacle has been resolved. For example, at the time of reevaluation at block 1106, the position of the previously detected obstacle relative to at least the auxiliary device 126 may have moved so as to no longer be an obstacle to the change in the state of the auxiliary device 126 or associated machine component identifier.

Additionally, or alternatively, according to certain embodiments, at block 1114, the controller 102 can continue to monitor information provided by at least the interlock system 132 to identify when the previously detected obstacle is no longer a concern with respect to adjusting the state of the auxiliary device 126. In such a situation, the decision regarding whether to adjust the state of the auxiliary device 126 can again be evaluated at block 1106.

If, however, at block 1112, the controller 102 determines that the threshold has been exceeded, then at block 1116 the controller 102 can generate one or more signals to facilitate an outputting, via one or more output devices 1122, of an alert, including an error or status notification, for the operator. Moreover, the controller 102 can generate and alert that can notify the operator of a potential issue that may require the operator to resolve. Further, in such a situation, the controller 102 can generate one or more signals to at least temporarily suspend, at block 1118, attempts to adjust the state of one or more auxiliary devices 126 or other changes associated with transitioning to the operational mode that was identified at block 1102.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A method for controlling a state of an auxiliary device of an agricultural machine, the method comprising:
   determining an operational mode for the agricultural machine;
   identifying a predetermined state for the auxiliary device corresponding to the operational mode;
   sensing a current state of the auxiliary device; and
   adjusting, in response to the current state of the auxiliary device being different than the predetermined state, the auxiliary device to the predetermined state, the adjusting being initiated such that the auxiliary device is at the predetermined state when the agricultural machine is at a location or a position associated with the operational mode.

2. The method of claim 1, wherein the predetermined state of the auxiliary device corresponds to at least one of: an open position or a closed position of the auxiliary device, a raised position or a lowered position of the auxiliary device, and an extended or retracted position of the auxiliary device.

3. The method of claim 1, wherein the auxiliary device comprises at least one of a ladder, a grain tank cover, an air scoop, a foldable auger, and a header system.

4. The method of claim 1, wherein determining the operational mode comprises receiving a signal from an input device that indicates an operator selected operational mode.

5. The method of claim 1, further comprising:
   determining an actual position of the agricultural machine relative to a location of one or more features represented in a field boundary map, the one or more features being representative of at least one of a road, a field, a crop material, and a passageway; and
   determining a predicted position of the agricultural machine relative to the one or more features, and
   wherein determining the operational mode for the agricultural machine comprises determining the operational mode using the actual position and the predicted position of the agricultural machine.

6. The method of claim 1, further comprising:
   assigning a task to the agricultural machine; and
   identifying a predetermined operational mode designated for the assigned task, and
   wherein the operational mode is the predetermined operational mode.

7. The method of claim 1, further comprising:
   receiving a first feedback signal containing information indicative of an obstacle prior to adjusting of the auxiliary device from the current state to the predetermined state;
   delaying, using information from the first feedback signal, the adjusting of the auxiliary device.

8. A method for controlling a state of an auxiliary device of an agricultural machine, the method comprising:

determining an operational mode for the agricultural machine;

identifying a predetermined state for the auxiliary device corresponding to the operational mode;

determining a current state of the auxiliary device;

receiving one or more first feedback signals containing information indicative of a presence of an obstacle prior to an adjustment of the auxiliary device from the current state to the predetermined state; and determining, from information in the one or more first feedback signals, whether to delay or proceed with adjusting of the auxiliary device;

determining, in response to determining to delay the adjustment of the auxiliary device, whether a predetermined threshold number of delays has been satisfied;

receiving, if the adjustment of the auxiliary device has been delayed and the predetermined threshold number of delays has not been satisfied, a second feedback signal indicative of an absence or a removal of the obstacle; and adjusting, in response to at least receipt of the second feedback signal, the auxiliary device to the predetermined state.

9. The method of claim 8, further comprising generating, in response to the predetermined threshold of delays being satisfied, one or more alerts to be outputted by one or more output devices.

10. The method of claim 9, further comprising suspending adjustment of the auxiliary device in response to at least the predetermined threshold number of delays being satisfied.

11. The method of claim 8, wherein determining the operational mode comprises receiving a signal from an input device that indicates an operator selected operational mode.

12. The method of claim 8, further comprising:

determining an actual position of the agricultural machine relative to a location, as provided by a field boundary map, of one or more features represented in the field boundary map, the one or more features being representative of at least one of a road, a field, a crop material, and a passageway; and determining a predicted position of the agricultural machine relative to the one or more features, and wherein the operational mode is determined, at least in part, using the actual position and the predicted position of the agricultural machine.

13. The method of claim 8, further comprising:

assigning a task to the agricultural machine; and identifying a predetermined operational mode designated for the assigned task, and wherein the operational mode is the predetermined operational mode.

14. The method of claim 8, wherein the predetermined state of the auxiliary device corresponds to at least one of an open position or a closed position of the auxiliary device, and a raised position or a lowered position of the auxiliary device, and an extended or retracted position of the auxiliary device.

15. The method of claim 8, wherein the auxiliary device comprises at least one of a ladder, a grain tank cover, an air scoop, a foldable auger, and a header system.

16. A system for an agricultural machine, the system comprising:

an auxiliary device configured for selective displacement between at least a first state and a second state;

an auxiliary sensor configured to provide information indicative of a current state of the auxiliary device, the current state corresponding to the auxiliary device being at the first state, the second state, or an intermediate state between the first state and the second state;

an actuator configured to displace the auxiliary device at least between the first state and the second state;

an onboard sensor;

at least one processor; and a memory device coupled to the at least one processor, the memory device including instructions that when executed by the at least one processor cause the at least one processor to:

determine an operational mode for the agricultural machine;

identifying a predetermined state for the auxiliary device corresponding to the operational mode;

identify, from, information provided by the auxiliary sensor, the current state of the auxiliary device;

determine, if the current state is different than the predetermined state, an adjustment to an outer profile of at least a portion of the agricultural machine that will occur if the auxiliary device is displaced to the predetermined state;

identify, using information provided by the onboard sensor, an external obstacle to the adjustment to the outer profile if the auxiliary device were to be displaced to the predetermined state;

delay, in response to the external obstacle being identified, the displacement of the auxiliary device to the predetermined state;

determine, after the delay, an absence or a change in a position of the external obstacle; and adjust, in response to the absence or the change in position of the external obstacle, the outer profile of at least the portion of the agricultural machine by at least displacement of the auxiliary device to the predetermined state.

17. The system of claim 16, wherein the memory device further includes instructions that when executed by the at least one processor cause one or more of the at least one processor to:

determining if a duration of the delay of the displacement of the auxiliary device to the predetermined state satisfies a predetermined threshold, and generate, if the predetermined threshold is satisfied, a signal for an output of an operator alert signal from an output device.

18. The system of claim 16, wherein the auxiliary device comprises at least one of a ladder, a grain tank cover, an air scoop, a foldable auger, and a header system.

19. The system of claim 16, wherein the memory device further includes instructions that when executed by the at least one processor cause one or more of the at least one processor to:

determine an actual position of the agricultural machine relative to a location of one or more features represented in a field boundary map, the one or more features being representative of at least one of a road, a field, a crop material, and a passageway; and determine a predicted position of the agricultural machine relative to the one or more features, and wherein the operational mode is further determined using the actual position and the predicted position of the agricultural machine.

20. The system of claim 16, wherein the memory device further includes instructions that when executed by the at least one processor cause one or more of the at least one processor to:

identify a task assigned to the agricultural machine; and identify the operational mode designated for the assigned task.

\* \* \* \* \*